(12) United States Patent
Cabot

(10) Patent No.: US 12,188,884 B2
(45) Date of Patent: Jan. 7, 2025

(54) METHOD AND SYSTEM FOR INSPECTING A STRUCTURE ACROSS A COVER LAYER COVERING THE STRUCTURE

(71) Applicant: INVERSA SYSTEMS LTD., Fredericton (CA)

(72) Inventor: Peter Marc Cabot, Fredericton (CA)

(73) Assignee: INVERSA SYSTEMS LTD., Fredericton (CA)

( * ) Notice: Subject to any disclaimer, the term of this patent is extended or adjusted under 35 U.S.C. 154(b) by 254 days.

(21) Appl. No.: 17/921,164

(22) PCT Filed: Apr. 13, 2021

(86) PCT No.: PCT/CA2021/050491
§ 371 (c)(1),
(2) Date: Oct. 25, 2022

(87) PCT Pub. No.: WO2021/232142
PCT Pub. Date: Nov. 25, 2021

(65) Prior Publication Data
US 2023/0184701 A1    Jun. 15, 2023

Related U.S. Application Data

(60) Provisional application No. 63/026,833, filed on May 19, 2020.

(51) Int. Cl.
*G01N 23/203* (2006.01)
*G01N 17/00* (2006.01)
(Continued)

(52) U.S. Cl.
CPC ......... *G01N 23/203* (2013.01); *G01N 17/006* (2013.01); *G01N 17/02* (2013.01);
(Continued)

(58) Field of Classification Search
CPC ............... G01N 17/006; G01N 17/02; G01N 23/20008; G01N 23/203; G01N 2223/101;
(Continued)

(56) References Cited

U.S. PATENT DOCUMENTS 5,195,117 A   3/1993  Ong
5,729,582 A   3/1998  Ham et al.
(Continued)

*Primary Examiner* — Mark R Gaworecki
(74) *Attorney, Agent, or Firm* — Reno Lessard; Norton Rose Fulbright Canada LLP

(57) ABSTRACT

There is described a method for inspecting a structure across a cover layer covering the structure. The method generally has emitting a high energy photon beam along a photon path extending across said cover layer and leading to a target point within said structure, resulting in scattering along at least first and second scatter paths originating from said target point and extending across said cover layer and away therefrom, said first and second scatter paths forming a respective angle relative to said cover layer and defining an inspection plane comprising at least the target point; simultaneously detecting a first scatter signal incoming from said first scatter path and detecting a second scatter signal incoming from said second scatter path, and generating first and second values indicative therefrom; comparing said first and second values to one another; and inspecting said structure based on said comparing.

20 Claims, 16 Drawing Sheets

(51) Int. Cl.
*G01N 17/02* (2006.01)
*G01N 23/20* (2018.01)
*G01N 23/20008* (2018.01)

(52) U.S. Cl.
CPC . *G01N 23/20008* (2013.01); *G01N 2223/101* (2013.01); *G01N 2223/501* (2013.01); *G01N 2223/601* (2013.01); *G01N 2223/628* (2013.01); *G01N 2223/645* (2013.01); *G01N 2223/6466* (2013.01)

(58) Field of Classification Search
CPC ....... G01N 2223/501; G01N 2223/601; G01N 2223/628; G01N 2223/645; G01N 2223/6466
See application file for complete search history.

(56) References Cited

U.S. PATENT DOCUMENTS

| | | |
|---|---|---|
| 2018/0172876 A1 | 6/2018 | Inanc et al. |
| 2019/0079028 A1 | 3/2019 | Georgeson et al. |
| 2019/0145914 A1 | 5/2019 | Miyoshi et al. |

METHOD AND SYSTEM FOR INSPECTING A STRUCTURE ACROSS A COVER LAYER COVERING THE STRUCTURE

FIELD

The improvements generally relate to structure inspection and more specifically relate to structure inspection using non-destructive inspection (NDI) and/or non-destructive testing (NDT).

BACKGROUND

Structures which are covered with cover layers for protection and/or insulation purposes may be difficult to inspect. For instance, when a metallic structure corrodes over time, the resulting corrosion may be obscured by the cover layer. Accordingly, proper inspection of such structure may require the removal of the cover layer, thereby allowing visual inspection of the underlying structure, after which the cover layer is to be re-installed over the inspected structure. However, as time-consuming as the removal and re-installation of the cover layer can be, the required manipulations may damage the cover layer in addition to cause undesirable temperature variation in the structure. Although conventional visual inspection is satisfactory to a certain degree, there thus remains room for improvement, especially in inspecting the structure across its cover layer.

SUMMARY

In an aspect, there is described a method and system for inspecting a structure across a cover layer covering the structure. The structure has a first material of a first density whereas the cover layer has a second material of a second density lower than the first density. For instance, the structure can be metallic while the cover layer can be an insulating or otherwise protective layer covering the metallic structure. The method and system generally have a high energy photon source (e.g., a gamma ray source, an x-ray source) emitting a high energy photon beam along a photon path extending across the cover layer and leading to a target point P within the structure. The propagation of the high energy photon beam along the photon path results in scattering along at least first and second scatter paths originating from the target point P and extending back across the cover layer and away therefrom. When the first and second scatter paths form a respective scatter angle $\theta$ relative to the cover layer, they define an inspection plane comprising at least the target point P. The method and system have first and second detectors simultaneously detecting first and second scatter signals incoming from a respective one of the first and second paths. First and second values indicative of a respective one of the first and second scatter signals are then generated by the first and second detectors, respectively. The system and method have a controller receiving the first and second values, comparing the first and second values to one another and inspecting the structure based on that comparison.

In some embodiments, especially those where the scatter angles $\theta$ of the first and second scatter paths correspond to one another and where the first and second detectors are calibrated relative to one another, the comparison can involve calculating a ratio of the first and second values, e.g., the first value over the second value, or vice versa. In these embodiments, a unitary ratio can be indicative that the inspected structure has satisfactory, or at least comparatively similar, integrity along the first and second scatter paths. For instance, satisfactory integrity could be indicative that no amount of corrosion is detected along either one of the first and second scatter paths. Conversely, a ratio below or above the unity can be indicative that the inspected structure has unsatisfactory, or at least comparatively dissimilar, integrity along the first and second scatter paths. The rationale supporting these embodiments lies in that if the first and second scatter paths form the same angle $\theta$ relative to the cover layer, then the probabilities of scattered photons reaching a respective one of the first and second detectors would be the same as the first and second scatter signals would have, if the structure and cover layer have satisfactory integrity, to penetrate through a corresponding amount of structure and cover layer. In such circumstances, the first and second values of the first and second scatter signals would likely be equal to one another.

In accordance with a first aspect of the present disclosure, there is provided a method for inspecting a structure across a cover layer covering the structure, the method comprising: emitting a high energy photon beam along a photon path extending across said cover layer and leading to a target point within said structure, resulting in scattering along at least first and second scatter paths originating from said target point and extending back across said cover layer and away therefrom, said first and second scatter paths forming a respective angle relative to said cover layer and defining an inspection plane comprising at least the target point; simultaneously detecting a first scatter signal incoming from said first scatter path and detecting a second scatter signal incoming from said second scatter path, and generating first and second values indicative therefrom; comparing said first and second values to one another; and inspecting said structure based on said comparing.

Further in accordance with the first aspect of the present disclosure, the method can for example further comprise associating said first and second values to said target point.

Still further in accordance with the first aspect of the present disclosure, the method can for example further comprise: collectively moving said photon path, said first scatter path, and said second scatter path within said inspection plane such that said photon path, said first scatter path, and said second scatter path intersect at another target point within said structure; and repeating said steps of emitting, simultaneously detecting, generating, comparing, and associating for said other target point; wherein said inspecting is based on said first and second values associated to both said target point and to the other target point.

Still further in accordance with the first aspect of the present disclosure, the method can for example further comprise repeating the method for a plurality of other target points lying in said inspection plane and within said structure.

Still further in accordance with the first aspect of the present disclosure, the method can for example further comprise outputting a surface profile indication indicative of a surface of said structure above said inspected target points, wherein said inspecting is based on said outputted surface profile indication.

Still further in accordance with the first aspect of the present disclosure, the method can for example further comprise printing a three-dimensional representation of said surface profile indication.

Still further in accordance with the first aspect of the present disclosure, said comparing can for example comprise calculating a ratio between said first and second values, and assigning said ratio to said corresponding target point.

Still further in accordance with the first aspect of the present disclosure, said angle formed between said first scatter path and said cover layer can for example be equal to said angle formed between said second scatter path and said cover layer.

Still further in accordance with the first aspect of the present disclosure, said photon path can for example lie in said inspection plane.

Still further in accordance with the first aspect of the present disclosure, said structure can for example be metallic, said inspecting can for example comprise evaluating whether corrosion is present across at least one of first and second scatter paths.

Still further in accordance with the first aspect of the present disclosure, said structure can for example have a first material of a first density, said cover layer can for example have a second material of a second density lower than said first density.

In accordance with a second aspect of the present disclosure, there is provided a system for inspecting a structure across a cover layer covering the structure, the system comprising: a photon path extending across said cover layer and leading to a target point within said structure; first and second scatter paths originating from said target point and extending back across said cover layer and away therefrom, said first and second scatter paths forming a respective angle relative to said cover layer and defining an inspection plane comprising at least the target point; a high energy photon source emitting a high energy photon beam along the photon path, resulting in scattering along at least the first and second scatter paths; a first detector detecting a first scatter signal incoming from said first scatter path, and generating a first value indicative of the first scatter signal; a second detector detecting a second scatter signal incoming from said second scatter path, and generating a second value indicative of the second scatter signal, said first and second scatter signals being detected simultaneously by said first and second detectors; a controller having a processor and a memory having stored thereon instructions that when executed by the processor perform the steps of: comparing said first and second values to one another; and inspecting said structure based on said comparing.

Further in accordance with the second aspect of the present disclosure, the sysm can for example further comprise a frame to which said high energy photon source, said first detector and said second detector are mounted.

Still further in accordance with the second aspect of the present disclosure, said frame can for example be provided in the form of a housing enclosing said high energy photon source, said first detector and said second detector.

Still further in accordance with the second aspect of the present disclosure, the system can for example further comprise feet spacing said frame from said cover layer.

Still further in accordance with the second aspect of the present disclosure, said feet can for example extend between proximal ends fixed to said frame and distal ends having rollers movably engageable with said cover layer.

Still further in accordance with the second aspect of the present disclosure, said controller can for example further perform: associating said first and second values to said target point; and upon collectively moving said photon path, said first scatter path, and said second scatter path within said inspection plane such that said photon path, said first scatter path, and said second scatter path intersect at another target point within said structure, repeating said steps of emitting, simultaneously detecting, generating, comparing, and associating for said other target point; wherein said inspecting is based on said first and second values associated to said target point and to the other target point.

Still further in accordance with the second aspect of the present disclosure, the system can for example further comprise repeating said method for a plurality of other target points lying in said inspection plane and within said structure.

Still further in accordance with the second aspect of the present disclosure, the system can for example further comprise a user interface outputting a surface profile indication indicative of a surface of said structure above said inspected target points.

Still further in accordance with the second aspect of the present disclosure, said angle can for example be formed between said first scatter path and said cover layer is equal to said angle formed between said second scatter path and said cover layer.

Still further in accordance with the second aspect of the present disclosure, said photon path can for example lie in said inspection plane.

Still further in accordance with the second aspect of the present disclosure, said structure can for example have a first material of a first density, said cover layer having a second material of a second density lower than said first density.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
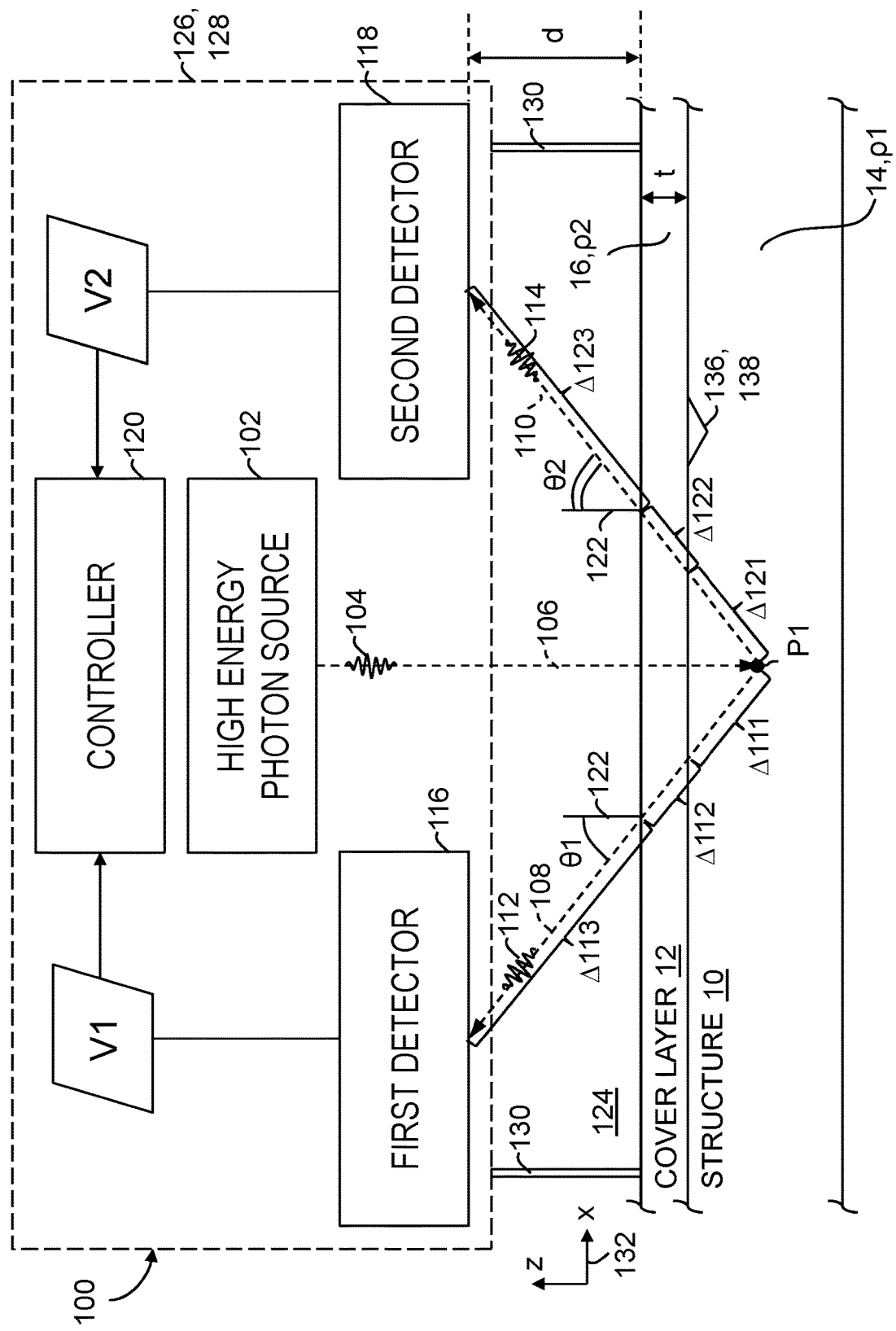
FIG. 1 is a schematic view of an example of a system for inspecting a structure across a cover layer covering the structure, shown with a high energy photon source, a first detector, a second detector and a controller, in accordance with one or more embodiments.

FIG. 1 is an example of a system 100 for inspecting a structure 10 across a cover layer 12 covering the structure 10. As described below, the inspection of the structure 10 is non-destructive. Accordingly, the cover layer 12 needs not to be removed, torn, replaced or otherwise damaged to inspect the underlying structure 10.

The type of structure 10 to be inspected with the system 100 can differ from one embodiment to another. For instance, the structure 10 can be provided in the form of a pipe, a container, a pressure vessel, a wall or any other form of flat or curved barrier. The cover layer 12 generally covers the underlying structure 10, and may differ in function depending on the circumstances. For instance, the cover layer 12 can be used as an insulating layer, a protective layer, an obscuring layer, a sprayed-on layer, a supporting layer or any combination thereof. It is noted that the cover layer 12 can comprise a plurality of superposed intermediate layers of different materials and of different densities. In some embodiments, each intermediate layer has a uniform thickness.

It is noted that the structure 10 has a first material 14 of a first density $\rho 1$ whereas the cover layer 12 has a second material 16 of a second density $\rho 2$ lower than the first density $\rho 1$, i.e., $\rho 1 > \rho 2$. For instance, the first material 14 of the structure 10 can be metal, concrete, high-density plastic, or any other higher density material. The second material 16 of the cover layer 14 can be plastic, foam, rock wool, glass wool, wood fiber, plant fiber, perlite, calcium silicate, or any other lower density material. In embodiments where the cover layer 12 has a uniform thickness, the second density $\rho 2$ of the second material 16 of the cover layer 12 needs not to be lower than the first density $\rho 1$ of the first material 14 of the structure 10. In fact, in some embodiments, the cover layer 12 may be denser than the structure 10, which may be inconvenient as it increases the inspection time as denser cover layers can impart increased detection times.

As shown, the system 100 has a high energy photon source 102 emitting a high energy photon beam 104 along a photon path 106 extending across the cover layer 12 and leading to a target point P1 within the structure 14. The high energy photon beam 104 can be a pencil beam, a fan beam, a cone beam and the like. Examples of such a high energy photon source 102 can include, but is not limited to, a gamma ray source comprising an unstable isotope emitting high energy photons from a natural decay process, an x-ray tube, a cyclotron produced radionuclide, a fast neutron source and the like. Typical unstable isotope used in such gamma ray sources can include Ceasium-132 ($^{132}Cs$), Iridium-192 ($^{192}Ir$), Cobalt-60 ($^{60}Co$), Cobalt-57 ($^{57}Co$), Europium-152 ($^{152}Eu$) and/or any other suitable unstable isotope.

As the high energy photon beam 104 propagates along the photon path 106 and across the cover layer 12 and the structure 14, the high energy photon beam 104 will experience attenuation. The matter with which the high energy photon beam 104 interacts can absorb some of the high energy photons, scatter some of the high energy photons or let some of the high energy photons penetrate further away across the matter. Each high energy photon propagating through the cover layer 12 and the structure 14 will thus have a probability of being absorbed, scattered or propagated through unaffected. These probabilities can depend on many parameters including, but not limited to, the composition of the first material 14, the composition of the second material 16, the first density $\rho 1$ of the first material 14, the second density $\rho 2$ of the second material 16, the energy of the high energy photons, and the penetration distance, to name a few examples. For instance, the probability of a high energy photon being propagating through the cover layer 12 without being absorbed or scattered is greater than the probability of a high energy photon being propagating through the structure 10, at least in view of the first density ρ1 of the structure 10 being greater than the second density ρ2 of the cover layer 12. Understandably, a greater density implies a greater number of atoms per volume unit and therefore an increased interaction (e.g., absorption, scattering) probability. For similar reasons, the probability of a high energy photon being absorbed or scattered is lower as it propagates through the cover layer 12 than as it penetrates through the structure 10. When a high energy photon is scattered by some matter, the high energy photon generally interacts with some charged particle and thereby loses at least some energy, after which the remaining energy is deflected as a scattered photon in any direction around the matter. The scattered photons are thereby characterized by an energy level Eout which is lower than an energy level Ein of the incoming high energy photons, i.e., Eout<Ein. This phenomenon is known as the Compton Effect. The probability of a given high energy photon being scattered at a given scatter angle θ is governed by some equations that, while bearing some relevance on a theoretical basis, are not described herein.

In any case, it is known that the scatter angle θ associated to a scattering interaction has at least some type of rotational symmetry in a manner that, when propagating across a material of a uniform density, the probability of a high energy photon being scattered along a first scatter path 108 forming a given scatter angle θ relative to the photon path 106 is identical to the probability of a high energy photon being scattered along a second scatter path 110 forming the same given scatter angle θ relative to the photon path 106. It was thus found that by monitoring scatter signals 112 and 114 incoming from two such scatter paths 108 and 110, one could inspect the structure 10 based on a comparison of the monitored scatter signals 112 and 114. Indeed, if the scatter signals 112 and 114 are identical, the structure 10 and the cover layer 12 can be assumed to be of similar integrity along the two scatter paths 108 and 110. However, if the scatter signals 112 and 114 differ from one another, it may be assumed that the structure 10 and the cover layer 12 may have differing integrity along the two scatter paths 108 and 110, as any difference between the two scatter paths 108 and 110 would thereby change the scatter probabilities and therefore the detected scatter signals 112 and 114.

Still referring to FIG. 1, the system 100 has a first detector 116 detecting a first scatter signal 112 incoming from a first scatter path 108, and generating a first value V1 indicative of the first scatter signal 112. As depicted, the first scatter path 108 originates from the target point P1 and extends across the cover layer 12 and away from the cover layer 12 towards the first detector 116. Moreover, the system 100 has a second detector 118 detecting a second scatter signal 114 incoming from a second scatter path 110, and generating a second value V2 indicative of the second scatter signal 114. As shown, the second scatter path 110 originates from the target point P1 and extends across the cover layer 12 and away therefrom towards the second detector 118. As can be appreciated in this example, the first and second detectors 116 and 118 sandwich the high energy photon source 102. Examples of the first and second detectors 116 and 118 can include, but is not limited to, a photomultiplier tube, a scintillator, a solid-state detector, a silicon photo-multiplier, a Geiger-Mueller detector, a liquid scintillation detector and the like. In any case, the first and second detectors 116 and 118 may be broadband in some embodiments. In some other embodiments, the first and second detectors 116 and 118 are by design or construction (e.g., using one or more dedicated spectral filters) enabled to detect photons having only the energy level Eout as would be expected from any photon scattered from the target point.

As depicted, the system 100 has a controller 120 having a processor and a memory having stored thereon instructions that when executed by the processor perform at least some predetermined steps. For instance, the controller 120 can receive the first and second values V1 and V2 from the first and second detectors 116 and 118, compare the first and second values V1 and V2 to one another, and inspect the structure 10 based on the comparison.

As shown, both the first and second scatter paths 108 and 110 form a respective angle θ relative to the cover layer 12. In this case, the first scatter path 108 forms a first scatter angle θ1 relative to a normal 122 of the cover layer 12 whereas the second scatter path 110 forms a second scatter angle θ2 relative to the normal 122 of the cover layer 12. In this specific embodiment, the first and second scatter angles θ1 and θ2 are identical to one another. In this way, a photon scattered from the target point P1 and detected by the first detector 112 would have had to propagate through a first distance Δ111 across the structure 10, a second distance Δ112 across the cover layer 12 and a third distance Δ113 through air 124. Similarly, a photon scattered from the target point P1 and detected by the second detector 118 would have had to propagate through a first distance Δ121 across the structure 10, a second distance Δ122 across the cover layer 12 and a third distance Δ123 through the air 124.

Assuming that the cover layer 12 has a uniform thickness t along the inspected region, i.e., that the second distances Δ112 and Δ122 are equal to one another, the probability of the first detector 116 detecting a scattered photon would be the same as the probability of the second detector 118 detecting a scattered photon upon emission of a high energy photon beam 104 along the photon path 106. Accordingly, upon emission of a high energy photon beam 104 along the photon path 106, it is expected that a comparison of the first and second values V1 and V2 generated by the first and second detectors 116 and 118, respectively, can indicate whether the structure 10 and/or the cover layer 12 are of similar integrity along the first and second scatter paths 108 and 110.

As can be appreciated, the high energy photon source 102, the first detector 116, and the second detector 118 may all be permanently or removably mounted to a frame 126. As shown in this example, the frame 126 is provided in the form of a housing 128 enclosing the high energy photon source 102, and the first and second detectors 116 and 118. As shown in this specific embodiment, the frame 126 can have one or more feet 130 spacing the frame 126 from the cover layer 10 along the z-axis. The length of feet may be tunable to adjust a specific distance d between the first and second detectors 116 and 118 and the cover layer 12, in some embodiments. In other embodiments, the feet 130 may be of fixed length. In some embodiments, the feet have proximal ends fixed to the frame 126 and distal ends having casters, rollers or sliders movably engageable with the cover layer. The feet 130 may be omitted altogether in some other embodiments. The controller 120 may be mounted to the frame 126, or housed within the housing 128 depending on the embodiment. In any case, the controller 120 is communicatively coupled to the first and second detectors 116 and 118, e.g., for receiving the first and second values V1 and V2 therefrom. The controller 120 may be communicatively coupled to the high energy photon source 120 as well as for controlling the emission. For instance, in embodiments where the high energy photon source 120 is provided in the form of an x-ray tube, the controller 120 can turn the emission on or off by controlling the power supplied to the x-ray tube. In embodiment where the high energy photon source 120 is provided in the form of a gamma ray source, the controller can control a shutter mechanism (not shown) to turn the emission on or off as desired. In some other embodiments, the controller 120 may be remote from the frame 126 or housing 128. In such embodiments, the communication between the controller 120 and the first and second detectors 116 and 118 may be wired, wireless or a combination thereof.

In some embodiments, the system 100 may incorporate one or more range finders evaluating the distance d between the system 100 and the cover layer 12. In some embodiments, the range finder(s) can be communicatively coupled with the feet to self-adjust whenever leveling of the system 100 relative to the cover layer 12 is required.

Figure 2:
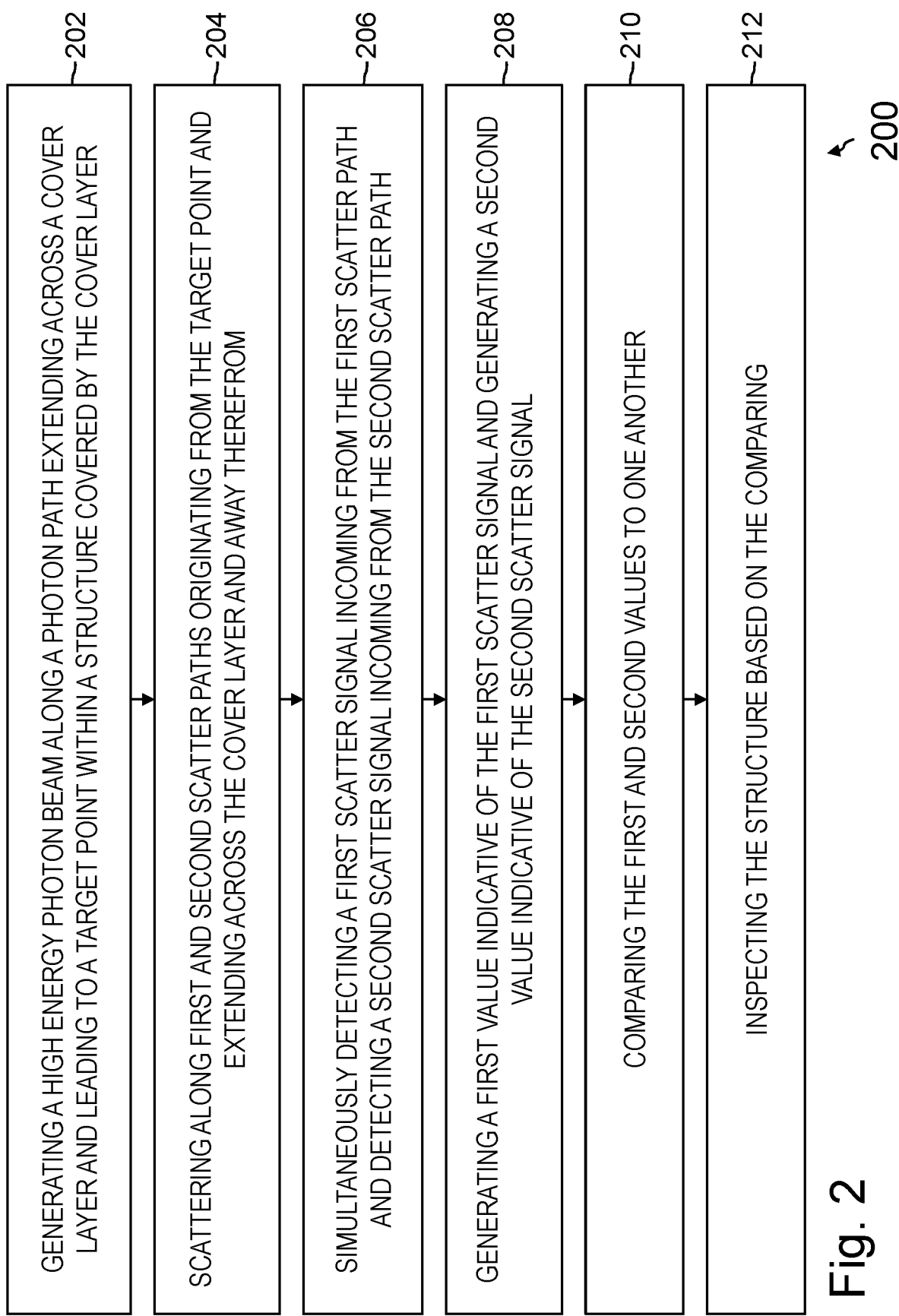
FIG. 2 is a flow chart of an example of a method for inspecting a structure across a cover layer covering the structure, in accordance with one or more embodiments.

Reference is now made to FIG. 2 which illustrates a flow chart of a method 200 of inspecting a structure covered by a cover layer. The method 200 will be described with reference to the structure 10, the cover layer 12 and the system 100 of FIG. 1 for ease of understanding.

At step 202, the high energy photon source 102 emits a high energy photon beam 104 along the photon path 106 which extends across the cover layer 12 and leads to the target point P1 within the structure 10.

In some embodiments, the photon path 106 can be perpendicular to the cover layer 12. However, in some embodiments, the photon path 106 can form either an acute or obtuse angle relative to the cover layer 12 or to its normal 122. The photon path 106 may lie in an inspection plane 132 (e.g., in the x-z plane) defined by the first and second scatter paths 116 and 118 in some embodiments whereas the photon path 106 can intersect the inspection plane 132 in some other embodiments. It is noted that the emission of the high energy photon beam 104 can be continuous, periodical or triggerably on-demand. For instance, when the high energy photon source 102 is provided in the form of a gamma ray source, a shutter mechanism can be provided to turn the high energy photon beam 104 on and off as desired. The shutter mechanism may have a shielded gate movable between an open position in which the shielded gate is moved away from the photon path 106 and a close position in which the shielded gate is moved across the photon path 106. However, in other embodiments, the high energy photon source 102 may control the emission by turning the power supply on and off, especially when the high energy photon source 102 is provided in the form of an x-ray tube.

At step 204, scattering occurs at least along the first and second scatter paths 108 and 110 originating from the target point P1 and extending across the cover layer 12 and away therefrom towards the first and second detectors 116 and 118, respectively.

As the scattered photons travel at the speed of light, the scattering is expected to occur in a quasi-instantaneous manner following the emission of the high energy photon beam 104 along the photon path 106. It is encompassed that there exists more scatter paths than the first and second scatter paths 108 and 110. Indeed, as a high energy photon may scatter in any direction, an infinite number of scatter paths may exist. In this disclosure, the first and second scatter paths 108 and 110 are defined by the position of the first and second detectors 116 and 118 relative to the target point P1. Accordingly, should either one or both of the first and second detectors 116 and 118 be moved, the first and second scatter paths 108 and 110 would move correspondingly. However, it is noted that the system 100 can include additional detector pairs at mirrored angles to simultaneously collect scattered photons at additional scatter angles. For instance, in these embodiments, the first and second detectors 116 and 118 may be positioned at ±45 degrees whereas third and fourth detectors (not shown) may be positioned at ±60 degrees, and so forth.

At step 206, upon the emission of the high energy photon beam 104 along the photon path 106, the first and second detectors 116 and 118 simultaneously detect first and second scatter signals 112 and 114 which are incoming from a respective one of the first and second scatter paths 108 and 110.

The first and second detectors 116 and 118 are positioned in a predetermined geometrical relationship with regards to the cover layer 12 and to the target point P1. For instance, the first and second detectors 116 and 118 may have respective collimators which would discriminate scattering incoming from any other scatter paths than the first and second scatter paths 108 and 110 in addition to discriminate scattering incoming from any other point than the target point P1. It is noted that the scatter angles θ1 and θ2 of the first and second scatter paths 108 and 110 can be set by orienting the first and second detectors 116 and 118, and more specifically their respective collimators, in a direction leading to the target point P1.

At step 208, the first and second detectors 116 and 118 generate first and second values V1 and V2 indicative of a respective one of the first and second scatter signals 112 and 114.

As per any type of detector, the first and second detectors 116 and 118 generate values V1 and V2 which are proportional to the detected scatter signals 112 and 114. In some embodiments, the generated value can be indicative of the total count of scattered photons impinging on the detector in a given amount of time. It is intended that the first and second values V1 and V2 generated by the first and second detectors 116 and 118 have similar parameters including, but not limited to, the acquisition time, the sensitivity, the recovery time, the dead-time, the efficiency, the resolution and the like. In embodiments where the first and second detectors 116 and 118 are of different types, and/or have different parameters, calibration data may be used to correlate the first value(s) V1 generated by the first detector 116 to the second value(s) V2 generated by the second detector 118.

At step 210, the controller 120 compares the first and second values V1 and V2 to one another.

In some embodiments, the comparison includes the calculation of one or more ratio(s) r of the first and second values V1 and V2, i.e., r=V1/V2 or r=V2/V1. In embodiments where the first and second detectors 116 and 118 are calibrated to one another, where the first and second angles θ1 and θ2 correspond to one another and where the photon path 106 is perpendicular to the cover layer 12, a unitary ratio (i.e., r=1) may indicate that the structure 10 has a satisfactory level of integrity. Under these circumstances the first and second values V1 and V2 are equal to one another, as is expected when the first, second and third distances Δ111, Δ112 and Δ113 along the first scatter path 108 corresponds to the first, second and third distances Δ121, Δ122 and Δ123 along the second scatter path 110. When the ratio r is below or above the unity (e.g., r>1, r<1), it may be indicative of at least some lack of integrity along the first and second scatter paths 108 and 110. More specifically, it can be indicative that at least one of the following equalities is not satisfied: i) Δ111=Δ121, ii) Δ112=Δ122 and iii) Δ113=Δ123.

However, it is intended that the first and second detectors 116 and 118 may not be perfectly calibrated to one another, in which case the ratio r at which the structure 10 has a satisfactory level of integrity can differ. Similarly, in embodiments where the first and second scatter angles θ1 and θ2 differ from one another, the ratio rat which the structure 10 has a satisfactory level of integrity can differ as well.

At step 212, the controller 120 inspects the structure 10 based on the comparison between the first and second values V1 and V2.

As can be appreciated, the controller 120 can output an indication as to whether the structure 10 has a satisfactory integrity. The outputted indication can be displayed and/or stored for later use. In some embodiments, the controller 120 can also output an alert indicating that the structure 10 does not satisfy some integrity requirements. The alert can be displayed or heard, and/or stored on the memory of the controller 120. In some embodiments, the controller 120 can transmit instructions to a three-dimensional printer to print a three-dimensional representation of the surface profile indication, thereby allowing visual inspection of any defect detected on the structure under inspection.

In some embodiments, the calculated ratio r, and/or the first and second values V1 and V2 are associated to the target point P1. These associated data can be stored on the memory of the controller 120 for further use, examples of which are described below.

The controller 120 can be provided as a combination of hardware and software components. The hardware components can be implemented in the form of a computing device 300, an example of which is described with reference to FIG. 3. Moreover, the software components of the controller 120 can be implemented in the form of a software application, an example of which may embody at least steps 210 and 212 of the method 200 shown in FIG. 2.

Figure 3:
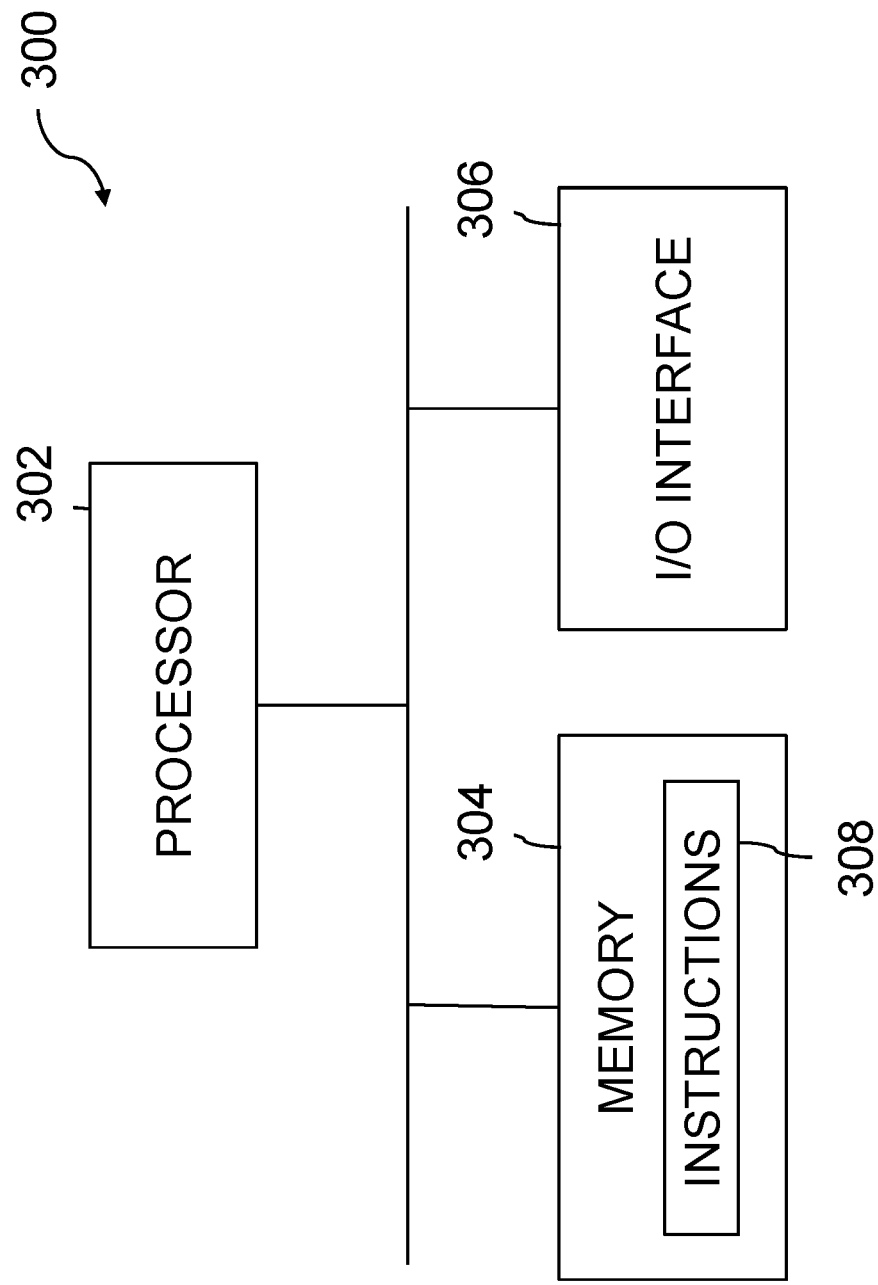
FIG. 3 is a schematic view of an example of a computing device of the controller of FIG. 1, in accordance with one or more embodiments.

Referring to FIG. 3, the computing device 300 can have a processor 302, a memory 304, and I/O interface 306. Instructions 308 for performing at least some comparison and inspection steps can be stored on the memory 304 and accessible by the processor 302.

The processor 302 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 304 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 306 enables the computing device 300 to interconnect with one or more input devices, such as the first and second detectors, range finder(s) evaluating the distance d between the system and the cover layer, mouse(s), keyboard(s), and user interface(s), or with one or more output devices such as a display, a speaker, an external memory system and/or an external network.

Each I/O interface 306 enables the controller 120 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In some embodiments, a software application receives first and second values V1 and V2 from the first and second detectors and process them in accordance with instructions stored on the memory 304 and accessible by the processor 302 of the computing device 300. The computing device 300 described above is meant to be an example only. Other suitable embodiments of the controller 120 can also be provided, as it will be apparent to the skilled reader.

Figure 4:
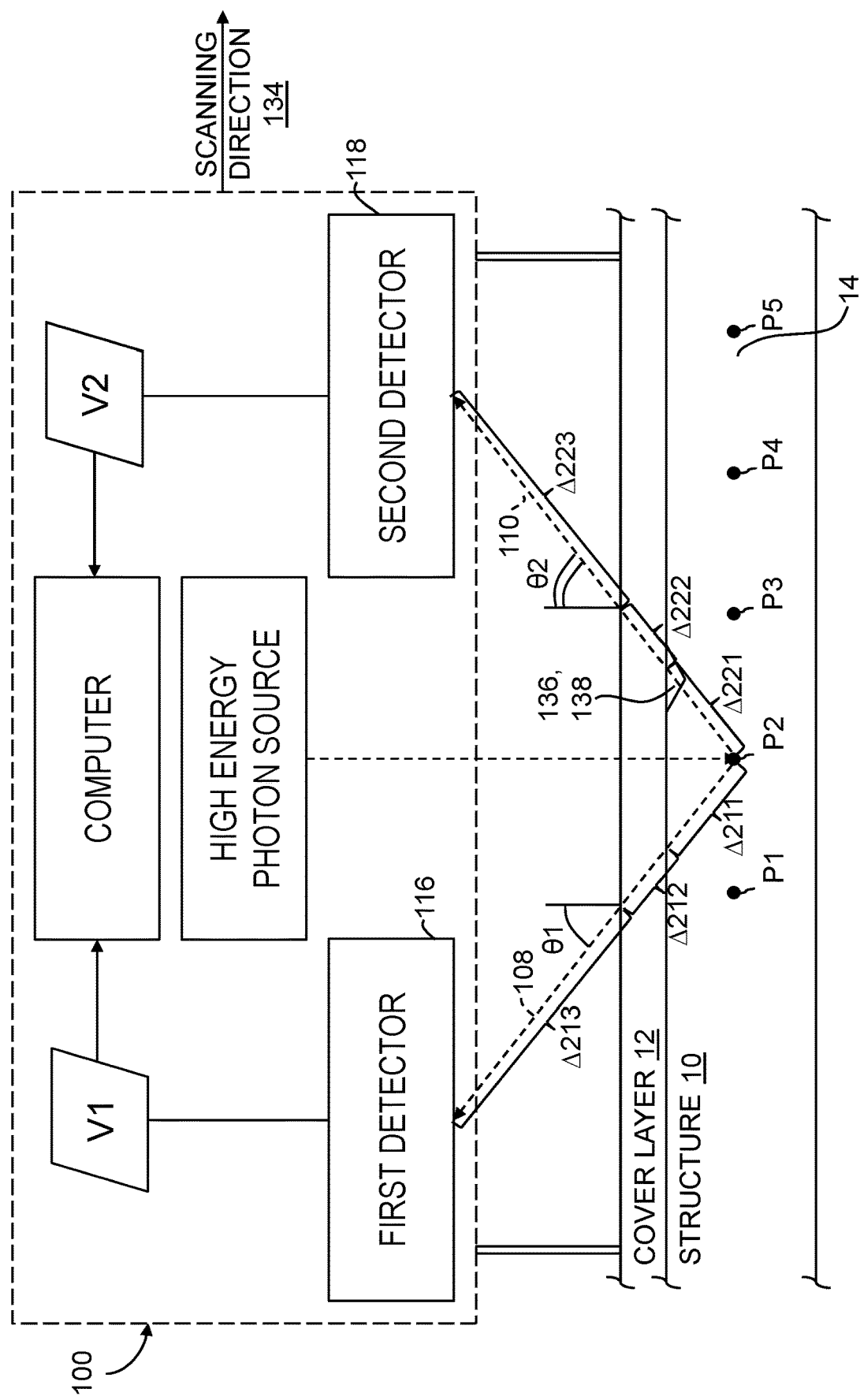
FIG. 4 is a schematic view of the system of FIG. 1, shown inspecting another target point within the structure, with a second scatter path extending across a defect within the structure, in accordance with one or more embodiments.
Figure 5:
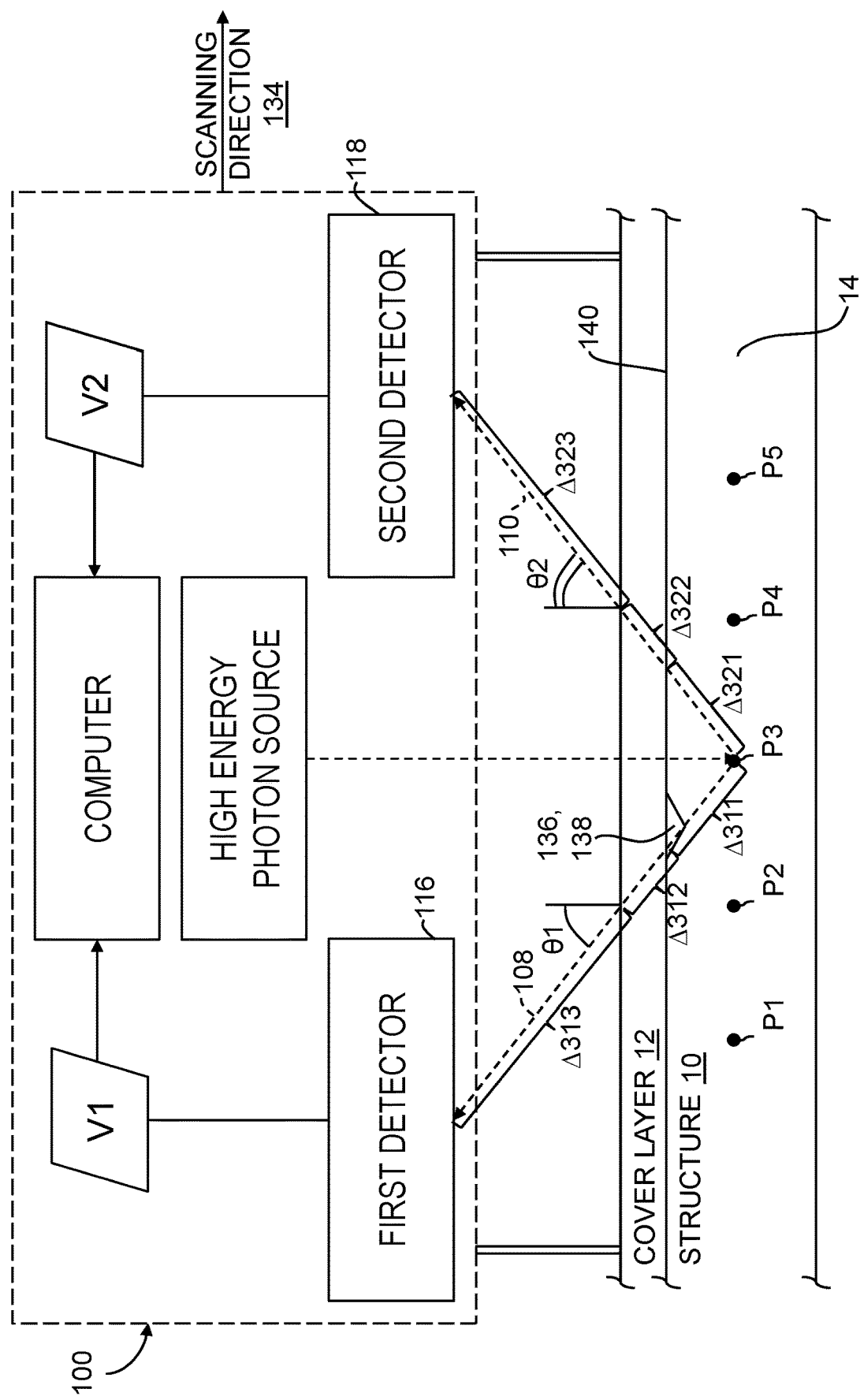
FIG. 5 is a schematic view of the system of FIG. 1, shown inspecting yet another target point within the structure, with a first scatter path extending across the defect within the structure, in accordance with one or more embodiments.

It is intended that the system and method described above can be used advantageously when a series of adjacent target points P1, P2, P3, ..., PN are sequentially inspected. Indeed, as FIG. 1 shows the system 100 during inspection of a first target point P1, FIG. 4 shows the system 100 as it is inspecting a second target point P2 and FIG. 5 shows the system 100 during inspection of a third target point P3. The inspection of the target points P1, P2, P3, ..., PN may be performed by moving the system 100, either incrementally or continuously, along a scanning direction 134 extending parallel to the cover structure 12. More specifically, while the inspection of each target point can be performed by moving the system 100 incrementally along the scanning direction 134 as each target point is inspected, the inspection can be performed while the system 100 is being continuously moved along the scanning direction 134, depending on the embodiment.

As shown in FIGS. 1, 4 and 5, a defect 136 is present along the structure 10. In some embodiments, the structure 10 is made of metal and the defect 136 is indicative of corrosion 138. As can be appreciated, the defect 134 is not detectable when the target point P1 is inspected using the system 100, as the first and second scatter paths 108 and 110 do not extend across or sample the defect 134. However, this is not the case when target points P2 and P3 are inspected using the system 100, as shown in FIGS. 4 and 5, respectively. As best shown in FIG. 4, one can notice that the second scatter path 110 extends across the defect 134, thereby creating a difference at least between the first distances Δ211 and Δ221. If the density of the defect 134 is lower than the first density ρ1 of the first material 14 of the structure 10, as it would be expected for corrosion, then the second value V2 generated by the second detector 118 while inspecting the target point P2 is expected to be greater than the first value V1 simultaneously generated by the first detector 116. Referring now to FIG. 5, one can notice that in this configuration the defect 136 is now across the first scatter path 108, thereby creating a difference at least between the first distances Δ311 and Δ321. In this case, the first value V1 generated by the first detector 116 while inspecting the target point P3 is expected to be greater than the second value V2 simultaneously generated by the second detector 118.

Figure 6:
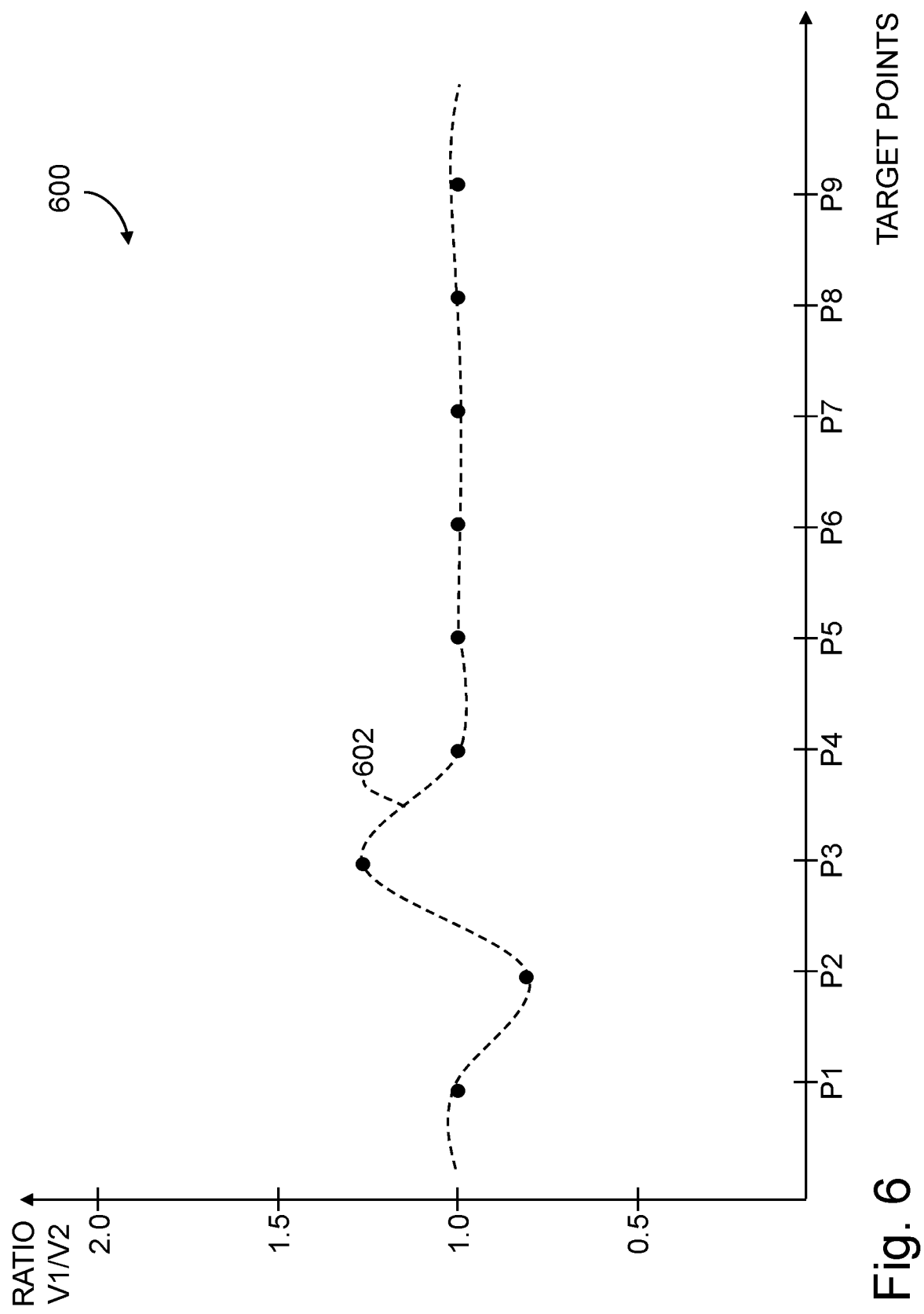
FIG. 6 is a graph showing a comparison between the values measured by the first and second detectors of FIG. 1 for a plurality of different target points, resulting in a surface profile indication, in accordance with one or more embodiments.

By comparing the first and second values V1 and V2 measured at each target point, an indication of the surface profile 140 of the structure 10 (hereinafter "the surface profile indication") can be mapped. For instance, FIG. 6 shows a graph 600 mapping the ratio r=V1/V2 for the target points P1, P2, P3, ..., PN as illustratively generated in FIGS. 1, 4 and 5. In this graph, it is assumed that the first and second scatter angles θ1 and θ2 are identical, and that the cover layer 12 has a uniform thickness above the inspected target points. Accordingly, inspection of the first target point P1 yields a unitary ratio r=1, as there is no particular defects along either one of the first and second scatter paths 108 and 110; inspection of the second target point P2 yields a ratio r below the unity as the second value V2 is greater than the first value V1 due to the defect 136 being across the second scatter path 110; inspection of the third target point P3 yields a ratio r above the unity as the first value V1 is greater than the second value V2 due to the defect 136 being across the first scatter path 108; and so forth, until the surface 140 of the structure 10 is mapped along a desired inspection path. A fit of the ratios r associated to each inspected target point can lead to the surface profile indication 602. The fit can be linear, polynomial and the like, depending on the embodiment. As can be understood, the surface profile indication can be updated in real-time whenever new target points have been inspected using the system 100.

It was found that by monitoring the ratios r of the target points, the resulting surface profile indication 602 can filter out some variables. For instance, minor defects in the cover layer 12 may be filtered out by such an inspection. The uniformity of the cover layer 12 may not be essential as well, as satisfactory surface profile indication 602 were obtained even though the cover layer 12 through which the inspection was performed was not uniform above the inspected target points.

Figure 7:
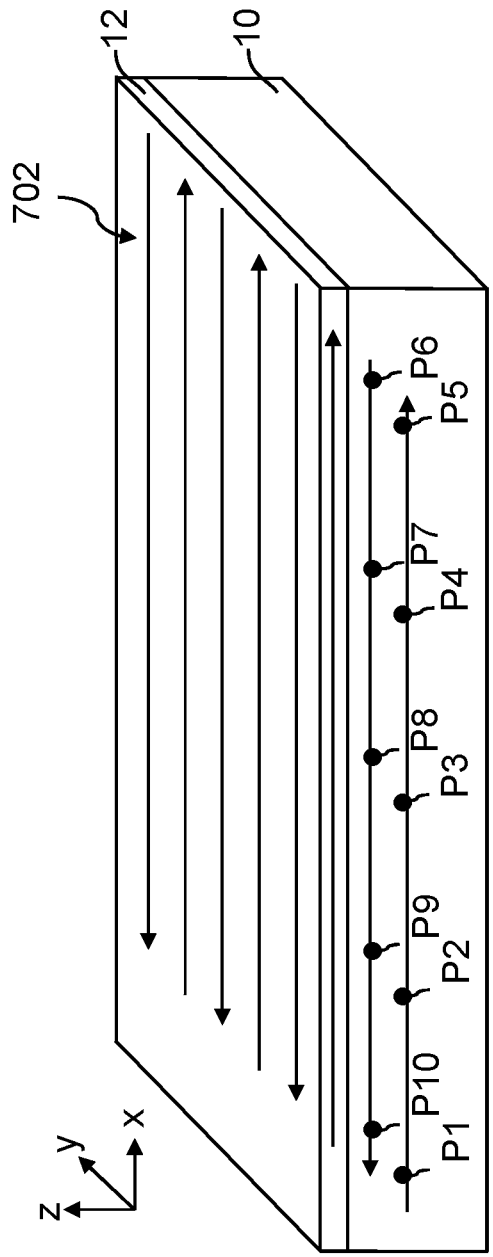
FIG. 7 is an oblique view showing an example of an inspection path along which a structure is inspected using the system of FIG. 1, in accordance with one or more embodiments.
Figure 8:
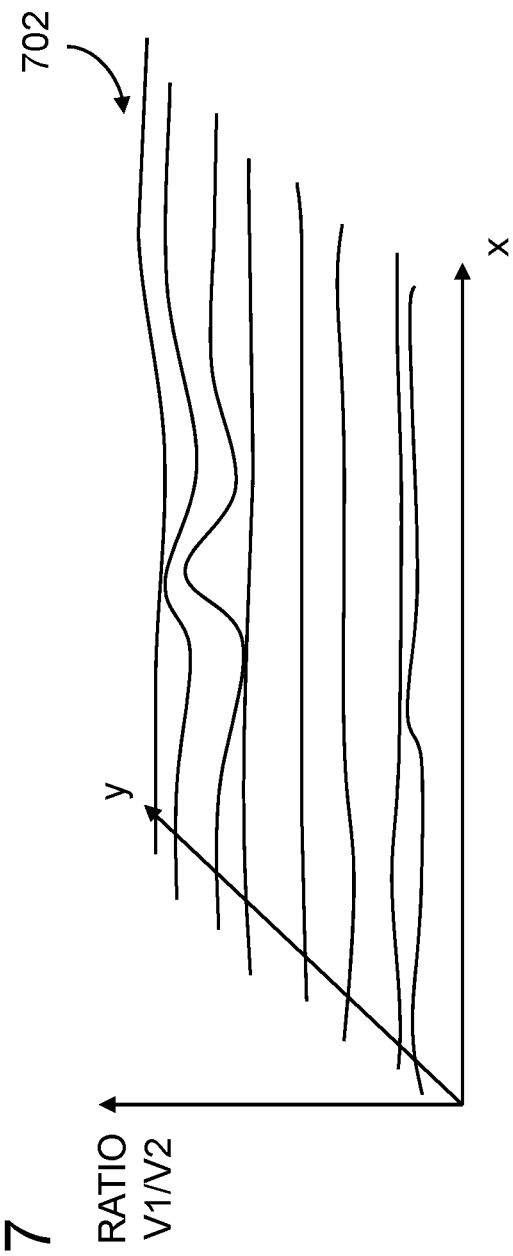
FIG. 8 is a three-dimensional graph plotting a three-dimensional surface profile outputted by inspecting the structure using the inspection path of FIG. 7, in accordance with one or more embodiments.

FIG. 7 shows an oblique view of an example inspection path 700 which goes in a sequence of back and forth along an area of the structure 10. In some embodiments, the inspection path 700 is shaped as a raster scan. In these embodiments, the resulting surface profile indication 702 can be plotted in three-dimensions such as shown in FIG. 8. It is envisaged that in some embodiments the structure 10 may be inspected with a plurality of inspection paths extending at different depths within the structure 10. In these embodiments, a structure profile indication can be outputted by stacking each of the surface profile indications obtained by inspecting the structure with the inspection paths.

It is noted that all the resulting ratios associated to the various inspected target points P1, P2, P3, . . . , PN can be combined into a mathematical simultaneous solution, even the ratios associated to target points PN taken at different depths, to resolve the surface profile indication of the structure 10 in the area being inspected by the system 100. Broadly described, as measurements are compared to one another calculate ratios, the ratios associated to different target points can further be compared to one another to form an enhanced overall surface profile indication of the surface being inspected. In some embodiments, one may print a three-dimensional representation of the surface profile indication thereby allowing visual inspection of any defects of the structure under inspection.

Example 1

Determining a Differential Matrix Allowing the Surface Profile Indication to be Updated Based on Ratios Associated to Further Inspect Target Points Typical radiographic images are taken by bombarding a subject with high energy photons emitted from either an x-ray tube or emitted from the natural decay process of an unstable isotope. The intensity of the photon beam is attenuated as it travels through the medium according to the density along its path. The beam is captured and quantified as it exits the medium so that the average density along the transmission path can be calculated given known material parameters. This form of beam modulation can be one of simple intensity. Intensity can be likened to the "brightness" of the beam and is, essentially, the number of high energy photons being transmitted per unit of time. The intensity can thereby be quantified in terms of number of photons counted at a detector per second, for instance.

A second form of modulation known as energy modulation or wavelength modulation can also occur. Wavelength and energy are interchangeable for gamma radiation. For the purposes of this example, energy modulation is dealt primarily through what is known as the Compton Effect.

When a gamma photon interacts with another charged particle (in this case, this will typically be an electron), it can change direction. The energy of the photon (e.g., measured in electron volts) can decrease with respect to the magnitude of direction change. The probabilities governing the direction change (known as scatter angle) and the probability of an interaction occurring are governed by equations that are not described herein.

As mentioned previously, the intensity of a beam is attenuated by the medium it passes through. The amount by which the beam is ultimately reduced is governed by four main parameters: i) material composition where different material compositions mean different ratios of protons, electrons, and neutrons. This example does not go into the exact relationship, but as will be shown shortly, each material can present a different probability of interaction; ii) material density where material density can be a measure of the amount of mass per unit volume and is typically expressed in grams per cubic cm or g/cc (the symbol used to express density is the Greek letter ρ); iii) energy where the energy carried by a single photon is typically measured in electron Volts or eV for short. Energy can be thought of as "penetrating power". The higher the energy, the easier it is for a photon to pass through a length of material unaffected. In this example, energy is expressed by the letter E; and iv) distance where the further a photon travels through a material, the higher chance it has of interacting with the material. In this example, distance through a material is expressed by the Greek letter Δ.

Note that the combination of material composition and material density, referred to as the medium, is represented in this document by the Greek letter ω.

Figure 9A:
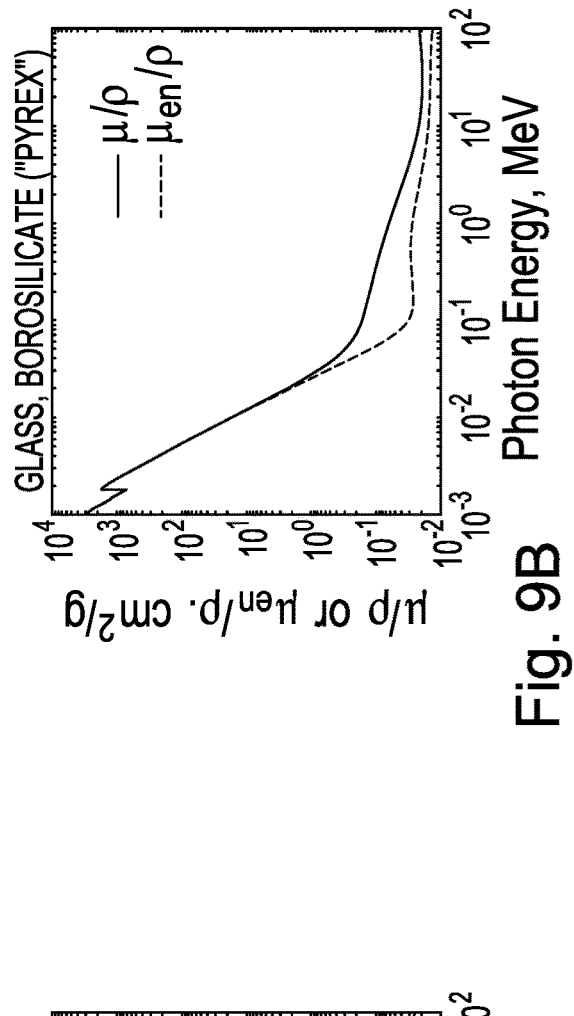
FIGS. 9A and 9B are graphs showing attenuation coefficient per density unit of high energy photons propagating across cesium iodide and glass, respectively.
Figure 9B:
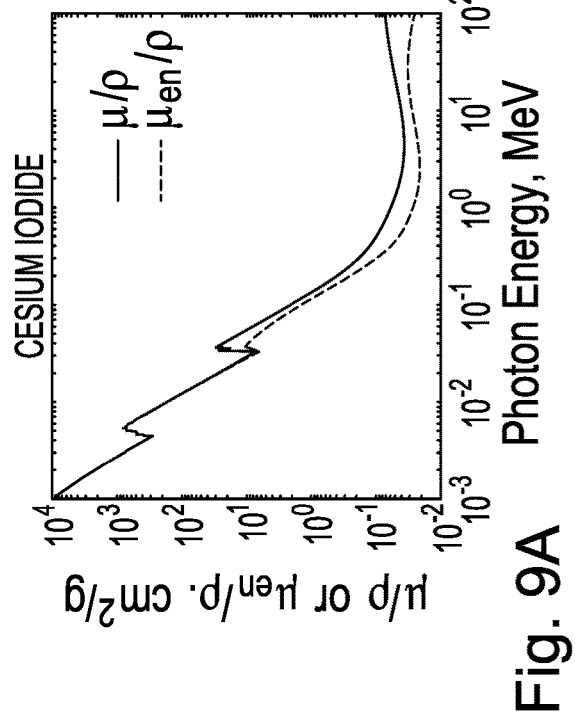

The first step in determining how a material will affect the intensity of a known beam of gamma photons is to use both the material composition and photon energy to find a parameter known as attenuation coefficient per unit of density denoted as μ/ρ. This parameter is difficult to calculate and is often found experimentally or by using a lookup figure similar to those shown in FIGS. 9A-9B.

Each of these figures represents the attenuation coefficient per unit of density of a particular material (see graph titles). Note that these figures do not represent continuous functions.

Once the attenuation per unit of density is found (e.g., using a lookup table, mathematical relation or figure such as those illustrated at FIGS. 9A-9B), it needs only be multiplied by the density of that material to find the attenuation coefficient (μ) of the medium.

Once the attenuation coefficient of the medium is known, the probability of a photon passing through a length of the medium can be computed as follows:

$$P(\mu_{107}, \Delta) = e^{\mu_\omega \cdot \Delta}, \qquad \text{Equation 1}$$

where $\Delta$ is the distance traveled through the medium (in units of length) and $\mu_{107}$ is the attenuation coefficient (in units of length$^{-1}$) of the medium $\omega$.

For example, for a photon traveling through a medium with attenuation coefficient of, say, $\mu_\omega = 0.3$ cm$^{-1}$ by a distance of $\Delta = 5$ cm, the probability of a single photon traveling through it can be:

$$P(\mu_\omega, \Delta) = P(0.3, 5) = e^{-0.3 \cdot 5} = 0.22313. \quad \text{Equation 2}$$

That is to say, approximately 22.3% of the incident photons will pass through unaffected. One can generalize this equation as follows:

$$I_{out} = I_{in} e^{-\mu \cdot \Delta}, \quad \text{Equation 3}$$

where $I_{out}$ is the final intensity and $I_{in}$ is the initial intensity of a photon beam.

If the photons were to travel through multiple mediums $(\mu_1, \mu_2, \ldots, \mu_n)$ at distances of $(\Delta_1, \Delta_2, \ldots, \Delta_n)$ respectively, then one can simply multiply the probability of traversing each medium onto the results of the last:

$$I_{out} = I_{in} \cdot e^{-\mu_1 \cdot \Delta_1} \cdot e^{-\mu_2 \cdot \Delta_2} \cdot e^{-\mu_3 \cdot \Delta_3} \cdots e^{\mu_n \cdot \Delta_n}, \text{ or}$$

$$I_{out} = I_{in} \cdot e^{-\Sigma_{n=1}\{\mu_m \cdot \Delta_m\}^n}. \quad \text{Equation 4}$$

The radiographic mode of imaging mentioned above is sometimes referred to as direct transmission imaging. This form of imaging is quite popular due to its simplicity.

Instead of capturing the high energy photons that pass through the subject, backscatter imaging captures the photons that are scattered (deflected) on their way through the subject back towards the incident side. The primary benefit of this method is that only a single side of the subject needs to be accessible. This is particularly attractive in situations where it is prohibitive to remove a vessel from service and/or it is too large for direct transmissions techniques to be of any use.

A backscatter measurement is taken by aiming a collimated gamma source and detector at a single point within the body of a subject. The collimation on both the source and detector constrain the photon beam to the incident and return paths desired.

Unlike direct transmission imaging, where the photon stream is attenuated according to the density of the material as it passes through, a backscatter-based system can modify the beam in a few additional ways: attenuation at the scattering point (as a function of the medium at that point); Compton shift at the point of scatter, reducing the energy of the photons as they change direction; and attenuation along the detector's field of view according to the medium and travel distances on the exiting path as well as the photon energy, post Compton shift.

Figure 11:
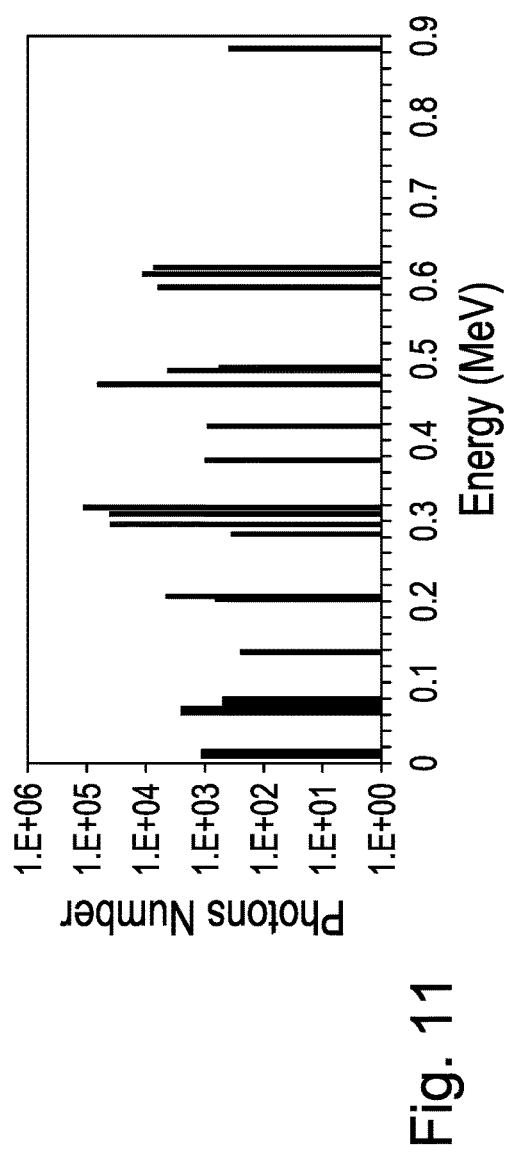
FIG. 11 is a histogram showing counts of high energy photons as a function of their energy levels for a gamma ray source comprising Iridium-192.
Figure 12:
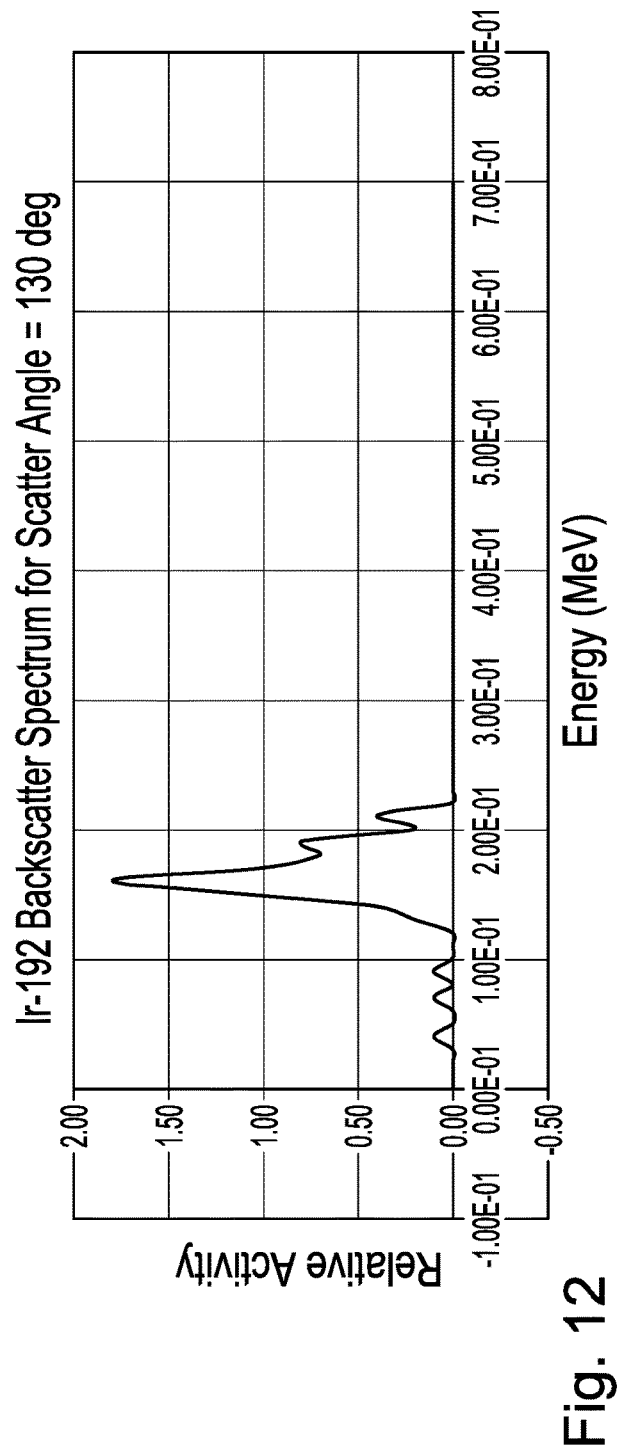
FIG. 12 is a graph showing counts of scattered photons as a function of their energy levels, where high energy photons emitted using the gamma ray source of FIG. 11 and propagated through 1 cm of 7.8 g/cc of carbide steel, in accordance with one or more embodiments.

This can result in a specific spectrum of photons accumulating over time at the detector that have been modulated by the entire travel path (source to scatter point to detector). This spectrum is not only different in intensity (as observed in direct transmission) but can also differ from the source in energy distribution, as can be appreciated from FIGS. 11 and 12.

Earlier it was shown that the attenuation coefficient can be based on material and density. Photon energy also has an effect on attenuation coefficient. A higher energy particle can have a lesser chance of interacting with the material as it passes through resulting in an effectively lower attenuation coefficient.

For the purposes of this example, the complex mechanics governing the scattering process can be reduced to a simple encapsulating function:

$$F(E, \theta, \omega), \quad \text{Equation 5}$$

where E is the energy of the photons (before the scattering event), $\theta$ is the angle of scatter, and $\omega$ is the medium at the point of scatter. The result of this function is a simple dimensionless fraction which can be multiplied onto the equation derived for the attenuation along the incident path (See Equation 4).

As photons scatter due to interaction with charged particles, the energy of the individual photons will diminish as a function of their deflection angle. This is known as "Compton scattering," and the change in energy is often referred to as a, "Compton Shift".

The computations involved are absorbed into the F(E, $\theta$, $\omega$) function mentioned previously (Equation 5). For this example, it is important to understand that the energy of a photon can generally be lower following a scatter event. This can effectively result in an attenuation co-efficient increase with each scatter event.

Incorporating all of the formulations above, one can write a general equation for a typical backscatter measurement as follows:

$$I_{out} = I_{src} \cdot e^{-\Sigma_{n=1}\{\mu_{in}(n)\Delta_{in}(n)\}^k} \cdot F(E, \theta, \omega_s) \cdot e^{-\Sigma_{n=1}\{\mu_{out}(n)\Delta_{out}(n)\}^k}. \quad \text{Equation 6}$$

Figure 10:
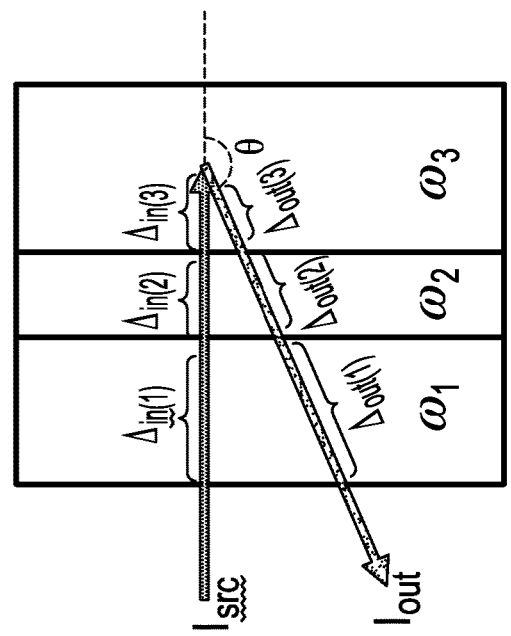
FIG. 10 is a sectional view showing different layers of material superposed to one another, showing a photon path and a scatter path forming a given scatter angle relative to the photon path, in accordance with one or more embodiments.

FIG. 10 depicts a single backscatter measurement through k=3 mediums; $\omega_1$, $\omega_2$, and $\omega_3$. The collimation is focused such that scattering takes place in material s=3 at a scatter angle of $\theta$.

Using Equation 6, one can calculate the final signal ($I_{out}$) of FIG. 10 as follows:

$$I_{out} = I_{src} \cdot e^{-\Sigma_{n=1}\{\mu_{in}(n)\Delta_{in}(n)\}^3} \cdot F(E, \theta, \omega_3) \cdot e^{-\Sigma_{N=1}\{\mu_{out}(n)\Delta_{out}(n)\}^k}. \quad \text{Equation 7}$$

Using Equation 6 as a "forward model" (that is to say, calculating $I_{out}$ given $I_{src}$) is relatively easy if the source is mono energetic (all photons are at or near a single energy).

The Compton energy shift at the scatter point can be calculated using the Compton shift equation (not shown in this example). Using the incident and (calculated) exit energies, $\mu_{in}$ and $\mu_{out}$ can be found using a lookup table, or simulated using Monte Carlo N-Particle (MCNP) analysis, or by simple experimentation.

Photon emission can be provided by using either an X-Ray tube or a radioactive material such as an unstable isotope. In this example, one can use Iridium-192 due to client constraints. This isotope, when collimated, can produce a poly-energetic photon beam. That is to say, the photons in the beam will vary in energy from photon to photon. The spectra for Ir-192 is generally as follows:

Note that the spectra are subject to change as the source decays over time, secondary radionuclides are generated, and by the presence of impurities.

For simplicity, one can think of the source beam as a series of overlapping monoenergetic beams. Difficulties arise as the lower energy beams (which experience higher attenuation coefficients) decay faster than their higher energy counterparts.; This can result in a beam with an average energy that increases as it passes through a medium. Consequently, the attenuation of the incoming beam can have a reduced attenuation coefficient despite traveling through a constant medium. This can make modeling the incident beam using basic equations such as the one described in Equation 4 problematic as those equations assume a constant $\mu$.

The exiting path, however, is much easier to deal with. A side effect of the Compton shift is that the exiting path tends to be more mono energetic, resulting in a more stable attenuation on the exiting path with respect to the incoming.

The goal of the following imaging technique is to eliminate the dependency of the backscatter equations on both the Compton effect and incident path while maintaining the ability to resolve the length of the exit paths enough to reconstruct the general shape of the primary material surface.

The goal of this methodology is to gauge defects on the surface of a vessel under a layer of insulting material. One can begin by further analyzing the most simplistic backscatter measurement previously discussed. In order to further simplify this application, one will assume the following constraints: the depth of all secondary medium is uniform; the primary medium is known (with a known associated µ); there is no failure by-product; the defect on the primary material is filled with a low-density material that can effectively be ignored (or regarded as near vacuum relative to the primary medium); and the measured signal has an insignificant or easily removed noise or multi scatter component.

Figure 13A:
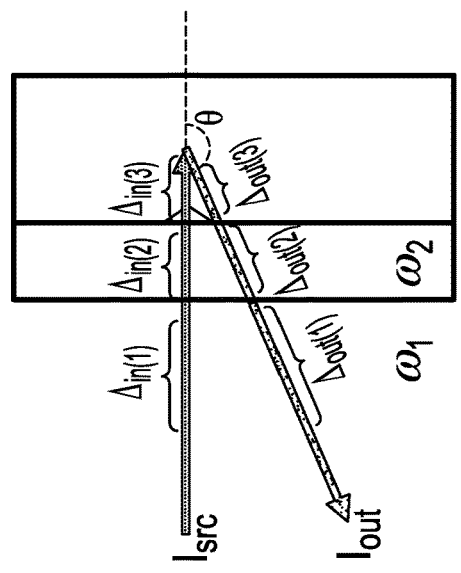
FIG. 13A is a sectional view showing an example of a cover layer covering a structure, with a photon path leading to a target point within the structure, and a scatter path extending back and away therefrom, with a defect within the structure and away from the photon and scatter paths, in accordance with one or more embodiments.
Figure 13B:
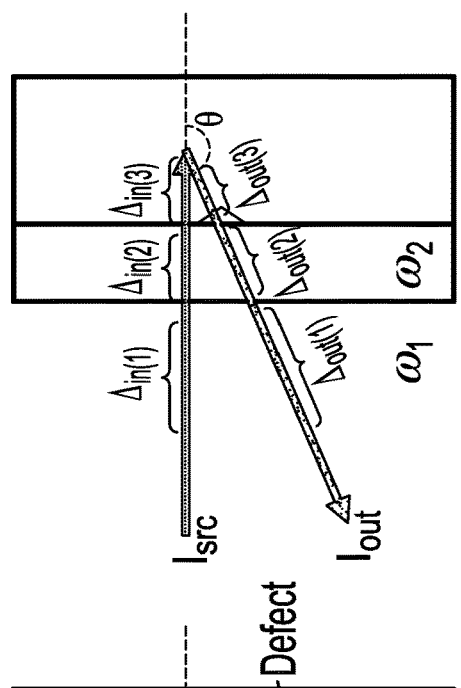
FIG. 13B is a sectional view of the cover layer and structure of FIG. 13A, with a defect across the scatter path, in accordance with one or more embodiments.
Figure 13C:
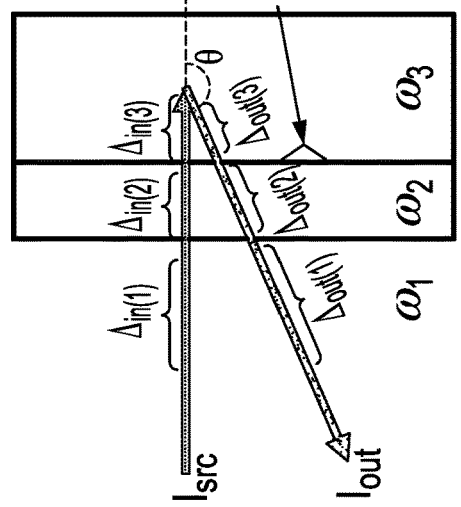
FIG. 13C is a sectional view of the cover layer and structure of FIG. 13A, with a defect across the photon path, in accordance with one or more embodiments.

In the following paragraphs quantify the flaw that moves past the measurement beam in FIGS. 13A and 13C. To do this, one can calculate $\Delta_{in(3)}$ and $\Delta_{out(3)}$. For reasons mentioned previously, this can be challenging. One can, however, calculate the change in $\Delta_{in(3)}$ and $\Delta_{out(3)}$ with respect to the natural log of the signal. To do this, one start with Equation 4:

$$I_{out} = I_{src} \cdot e^{-\sum_{n=1}^{3}\{\mu_{in(n)}\Delta_{in(n)}\}} \cdot F(E, \theta, \omega_3) \cdot e^{-\sum_{n=1}^{3}\{\mu_{out(n)}\Delta_{out(n)}\}};$$

$$\ln(I_{out}) =$$

$$\ln(I_{src}) + \ln\{F(E, \theta, \omega_3)\} - \sum_{n=1}^{3}\{\mu_{in(n)}\Delta_{in(n)}\} - \sum_{n=1}^{3}\{\mu_{out(n)}\Delta_{out(n)}\};$$

$$\frac{d\{\ln(I_{out})\}}{d\Delta_{in(3)}} = -\mu_{in(3)}; \frac{d\{\ln(I_{out})\}}{d\Delta_{out(3)}} = -\mu_{out(3)};$$

and $$d\{\ln(I_{out})\} = -\mu_{in(3)}d\Delta_{in(3)} - \mu_{out(3)}d\Delta_{out(3)}.$$

Equation 8 demonstrates a simple relationship between the attenuation path in medium 3 and the natural log of the signal. The signal will increase when the path through medium 3 is shortened on either the incident or return paths and in proportion to the attenuation coefficient of the path within the medium.

Note that a flaw will have a greater impact on $I_{out}$ on the exit path than it would on the source path. There are a couple reasons for this: the return path has a higher attenuation coefficient ($\mu_{out} > \mu_{in}$); and the beam path through the flaw is at an angle on the exit path ($d\Delta_{out(3)} \approx$ Pit depth$\times$Sec$\{\theta\}$).

Also, as mentioned earlier, the attenuation coefficient on the return path can be more consistent than it will be on the incident path. There is a clear benefit in finding a relationship to pit depth that does not depend on the incident attenuation path. To do so, one can use a ratio of two symmetric measurements that have a common source path.

Figure 14:
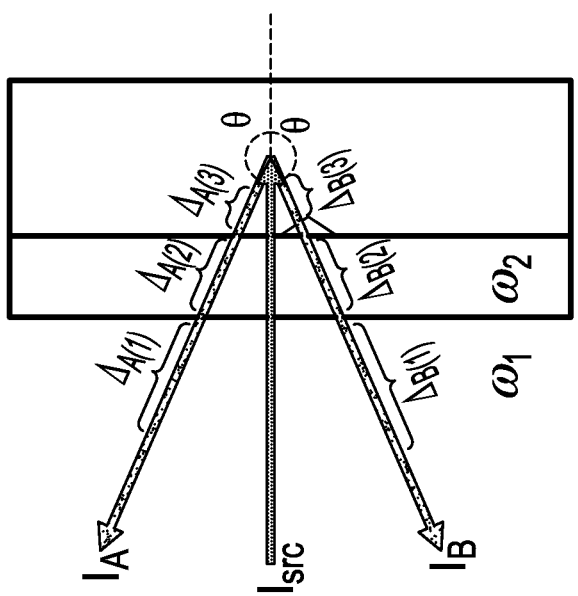
FIG. 14 is a sectional view showing a cover layer covering a structure, with a photon path leading to a target point within the structure and two scatter paths extending back and away from the target point, depicting a defect within the structure across one of the two scatter paths, in accordance with one or more embodiments.
Figure 15:
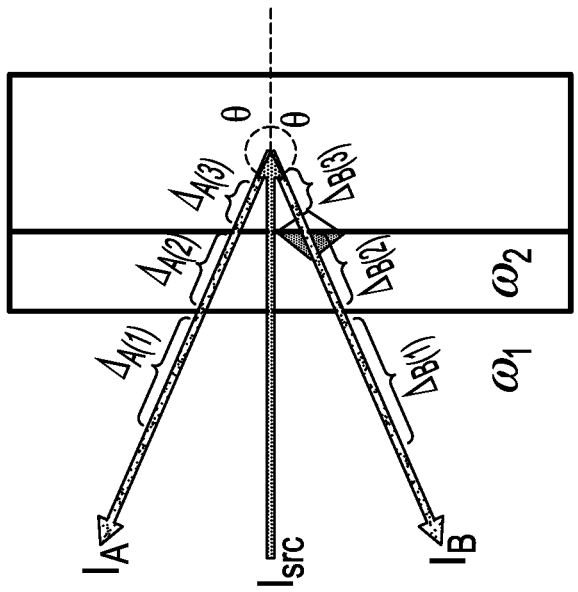
FIG. 15 is a sectional view of the cover layer and structure of FIG. 14, with the defect extending within the cover layer and the structure, in accordance with one or more embodiments.

By placing another detector on the opposite side of the incident beam and angling it to match scattering angles with the existing detector, such as shown in FIGS. 14 and 15, one can eliminate the source path and scatter factors from the differential equation through simple division:

$$I_A = I_{src} \cdot e^{-\sum_{n=1}^{3}\{\mu_{in(n)}\Delta_{in(n)}\}} \cdot F(E, \theta, \omega_3) \cdot e^{-\sum_{n=1}^{3}\{\mu_n \Delta_{A(n)}\}}; \quad \text{Equation 9}$$

$$I_B = I_{src} \cdot e^{-\sum_{n=1}^{3}\{\mu_{in(n)}\Delta_{in(n)}\}} \cdot F(E, \theta, \omega_3) \cdot e^{-\sum_{n=1}^{3}\{\mu_n \Delta_{B(n)}\}};$$

$$\frac{I_A}{I_B} = e^{\sum_{n=1}^{3}\{\mu_{B(n)}\Delta_{B(n)}\}} \cdot e^{-\sum_{n=1}^{3}\{\mu_{A(n)}\Delta_{A(n)}\}};$$

$$\ln\left(\frac{I_A}{I_B}\right) = \sum_{n=1}^{3}\{\mu_n \Delta_{B(n)}\} - \sum_{n=1}^{3}\{\mu_n \Delta_{A(n)}\};$$

$$\frac{d\{\ln\left(\frac{I_A}{I_B}\right)\}}{d\Delta_{A(3)}} = -\mu_3; \frac{d\{\ln\left(\frac{I_A}{I_B}\right)\}}{d\Delta_{B(3)}} = \mu_3; \text{ and}$$

$$d\{\ln\left(\frac{I_A}{I_B}\right)\} = \mu_3 \cdot (d\Delta_{B(3)} - d\Delta_{A(3)}).$$

Equation 9 demonstrates a solution for gauging open pits on a surface, however it does not account for the by-product material that results from the formation of the defect, as shown in FIG. 15. Typically, an oxide layer will form in the pit with an expansion proportional to the volume of the defect. To take this layer into account, one can first make the following assumptions:

The composition and density of the corrosion by-product can be known.

The expansion rate relative to the defect depth can also be known. The overall attenuation of the insulating layer remains constant along the scanning axis.

The corrosion medium can be introduced as an additional exponential term in the equation where the relationship between the amount of wall loss and the thickness of the corrosion layer is governed by the by-product formation ratio a (in units of corrosion volume unit per volume unit of wall loss, which is dimensionless).

The beam path through the pipe wall can be rewritten as follows:

$$\Delta_{B(3)} = \Delta_{Base} - \gamma_B;$$

$$\Delta_{A(3)} = \Delta_{Base} - \gamma_A;$$

$$\Delta_{A(C)} = \alpha \gamma_A; \text{ and}$$

$$\Delta_{B(C)} = \alpha \gamma_B;$$

where $\gamma$ is the wall loss for the primary material on exit path A or B (marked by the subscript) and $\Delta_{Base}$ is an arbitrary reference point place holder common to both exit paths. One can now reformulate the ratio equations using these new variables as well as the attenuation coefficient for the by-product material ($\mu_c$):

$$I_A = I_{src} \cdot e^{-\sum_{n=1}^{3}\{\mu_{in(n)}\Delta_{in(n)}\}} \cdot \quad \text{Equation 10}$$

$$F(E, \theta, \omega_3) \cdot e^{-\sum_{n=1}^{2}\{\mu_n \Delta_{A(n)}\} - \mu_3(\Delta_{Base} - \gamma_A) - \mu_C \alpha \gamma_A};$$

$$I_B = I_{src} \cdot e^{-\sum_{n=1}^{3}\{\mu_{in(n)}\Delta_{in(n)}\}} \cdot F(E, \theta, \omega_3) \cdot e^{-\sum_{n=1}^{2}\{\mu_n \Delta_{B(n)}\} - \mu_3(\Delta_{Base} - \gamma_B) - \mu_C \alpha \gamma_B};$$

$$\frac{I_A}{I_B} = e^{\sum_{n=1}^{2}\{\mu_n \Delta_{B(n)}\} + \mu_3(\Delta_{Base} - \gamma_B) + \mu_C \alpha \gamma_B - \sum_{n=1}^{2}\{\mu_n \Delta_{A(n)}\} - \mu_3(\Delta_{Base} - \gamma_A) - \mu_C \alpha \gamma_A};$$

$$\ln\left(\frac{I_A}{I_B}\right) = \sum_{n=1}^{2}\{\mu_n \Delta_{B(n)}\} + \mu_3(\Delta_{Base} - \gamma_B) +$$

$$\mu_C \alpha \gamma_B - \sum_{n=1}^{2}\{\mu_n \Delta_{A(n)}\} - \mu_3(\Delta_{Base} - \gamma_A) - \mu_C \alpha \gamma_A;$$

$$\frac{d\{\ln\left(\frac{I_A}{I_B}\right)\}}{d\gamma_A} = \mu_3 - \alpha \mu_C; \frac{d\{\ln\left(\frac{I_A}{I_B}\right)\}}{d\gamma_B} = \alpha \mu_C - \mu_3; \text{ and}$$

$$d\left\{\ln\left(\frac{I_A}{I_B}\right)\right\} = (\mu_n - \alpha\mu_C)d\gamma_A + (\alpha\mu_C - \mu_n)d\gamma_B.$$

Equation 9 and Equation 10 describe differential equations relating the change in ratio measurements with respect to the change in surface depth at various locations on the surface of the primary medium. The following section describes how to leverage such information along with actual ratio measurements to resolve the underlying surface model using an iterative solution model.

An iterative solution model is one that starts with an "initial guess" of the surface. The closer this initial guess is to reality, the quicker the model will resolve. A good initial guess for the system described herein can be a flawless plane at a specific depth determined using other means (the initial depth should be within a cm of the actual depth). If all the assumptions made earlier hold true, the ratios for the initial guess can easily be computed and compared to the actual measured values.

The computed ratios can be referred to as the forward ratios. The surface can then be adjusted to make the forward ratios more closely match the actual ratios. This process can be repeated until the error between the forward ratios and the measured ratios have been minimized.

First, one can build a solution model to resolve the simpler case of an open pit. One can easily adapt that model to account for a by-product material later.

First, one can place a series of points on the surface of the primary material and assume it to be initially flawless.

Each measurement ratio can be given a designator of $R_m$ where m is a numerical index for that measurement. Each point is given a designator of $P_n$ where n is a numerical index for that surface point. Initially each point is set to be of zero depth, or "at baseline".

The challenge lies in establishing the relationship between the surface points and the ratio values. For now, assume that $dR_m/dP_n$ (change in ratio m with respect to change in point n) can be known.

The following system of equations can be solved for $dR_m$ vector:

$$\begin{bmatrix} dR_1 \\ \vdots \\ dR_m \end{bmatrix} = \begin{bmatrix} \frac{dR_1}{dP_1} & \cdots & \frac{dR_1}{dP_n} \\ \vdots & \ddots & \vdots \\ \frac{dR_m}{dP_1} & \cdots & \frac{dR_m}{dP_n} \end{bmatrix} \begin{bmatrix} dP_1 \\ \vdots \\ dP_n \end{bmatrix}.$$

Calculations for $dR_m/dP_n$ can be established later. $dR_m$ can be calculated directly as the difference between forward ratios (based on the current surface guess) and those from physical acquisition using the following equation:

$$dR_m = \ln\left(\frac{I_{n(left)}}{I_{n(right)}}\right) - \mu_{primary}(\Delta_{n(left),primary} - \Delta_{n(right),primary}). \quad \text{Equation 11}$$

In practice, this iterative solution does tend to drift as it does not contain any information regarding the absolute position of any point (only positions relative to other points). To compensate for this drift, one can extend the derivative matrix to include a "weak correction" which can pull the solution back to the original baseline ($\beta$). W is the weight of the corrective matrix and can be scaled up or down as needed.

The matrix can further be stabilized by adding a "dampening" matrix. This can effectively provide a countermeasure to the effects of noise and small measurements errors.

$$\begin{bmatrix} \begin{pmatrix} dR_1 \\ \vdots \\ dR_m \end{pmatrix} \\ W \cdot \begin{pmatrix} \beta - P_1 \\ \vdots \\ \beta - P_n \end{pmatrix} \\ [0] \end{bmatrix} = \begin{bmatrix} \begin{pmatrix} \frac{dR_1}{dP_1} & \cdots & \frac{dR_1}{dP_n} \\ \vdots & \ddots & \vdots \\ \frac{dR_m}{dP_1} & \cdots & \frac{dR_m}{dP_n} \end{pmatrix} \\ (W \cdot [I]) \\ (W \cdot [I]) \end{bmatrix} \begin{bmatrix} dP_1 \\ \vdots \\ dP_n \end{bmatrix}. \quad \text{Equation 12}$$

The system can iterate until the forward error has been minimized. A measure of forward error can be made by summing the difference vector on the left-hand side.

$$\text{Conv} = \Sum_{p=1}^{m} |dR_p|.$$

When building the differential matrix, one need to know how the length of the detector path through the primary medium changes with respect to any point change on the surface. One can assume a line segment exists between each successive point along the surface. The detector path will change only when one of the two points defining the surface line segment that it crosses change (and will be zero for all other surface points). One will refer to these two points as $P_1$ and $P_2$ for the left and right most points, respectively. $P_c$ is the intersection point between the surface line segment and the detector path and $P_s$ is the point of scatter.

Each point can be broken down into an x and y component. For example, $P_s$ would have an x-component denoted by $x_s$ and y-component denoted by $y_s$.

The distance through the medium below the surface can be calculated as:

$$\Delta = \sqrt{(x_c - x_s)^2 + (y_c - y_s)^2}. \quad \text{Equation 13}$$

Ultimately, one wish to calculate the rate of change for the detection path through the primary medium with respect to the y component of $P_1$ and $P_2$. Since $x_s$ and $y_s$ are constant with respect to changes on the surface, they can be regarded as constant with respect to the derivative with respect to the y components:

$$\frac{d\Delta}{dy_n} = \frac{d}{dy_n}\left\{\sqrt{(x_c - x_s)^2 + (y_c - y_s)^2}\right\}; \quad \text{Equation 14}$$

$$\frac{d\Delta}{dy_n} = \frac{1}{2\sqrt{(x_c - x_s)^2 + (y_c - y_s)^2}} \cdot \frac{d}{dy_n}\left\{(x_c - x_s)^2 + (y_c - y_s)^2\right\};$$

$$\frac{d\Delta}{dy_n} = \frac{1}{2\Delta} \cdot \left[2(x_c - x_s)\frac{dx_c}{dy_n} + 2(y_c - y_s)\frac{dy_c}{dy_n}\right]; \text{ and}$$

$$\frac{d\Delta}{dy_n} = \frac{1}{\Delta}\left\{(x_c - x_s)\frac{dx_c}{dy_n} + (y_c - y_s)\frac{dy_c}{dy_n}\right\}.$$

Equation 14 shows general form for the derivative of the detector path length with respect to the change in $y_1$ or $y_2$.

To find $dx_c/dy_n$ and $dy_c/dy_n$, one can start by stating the line equations for the surface line and detector path:

$$y = m_s x + b_s; \text{ and} \quad \text{Equation 15}$$

$$y = m_d x + b_d. \quad \text{Equation 16}$$

Combining Equation 15 and Equation 16, one can write equations for the x and y components of $P_c$:

$$y_c = m_s x_c + b_s = m_d x_c + b_d;$$

$$m_s x_c - m_d x_c = b_d - b_s;$$

$$x_c = \frac{b_d - b_s}{m_s - m_d}; \quad \text{Equation 17}$$

$$x_c = \frac{y_c - b_s}{m_s} = \frac{y_c - b_d}{m_d};$$

$$m_d y_c - m_d b_s = m_s y_c - m_s b_d;$$

$$m_d y_c - m_s y_c = m_d b_s - m_s b_d; \text{ and}$$

$$y_c = \frac{m_d b_s - m_s b_d}{m_d - m_s}. \quad \text{Equation 18}$$

Equation 17 and Equation 18 can be differentiated in a general form:

$$\frac{dx_c}{dy_n} = \frac{d}{dy_n}\left\{\frac{b_d - b_s}{m_s - m_d}\right\}; \quad \text{Equation 19}$$

$$\frac{dx_c}{dy_n} = \frac{(m_s - m_d) \cdot \frac{d}{dy_n}(b_d - b_s) - (b_d - b_s) \cdot \frac{d}{dy_n}(m_s - m_d)}{(m_s - m_d)^2}; \text{ and}$$

$$\frac{dx_c}{dy_n} = \frac{(m_d - m_s)\frac{db_s}{dy_n} + (b_s - b_d)\frac{dm_s}{dy_n}}{(m_s - m_d)^2}.$$

Equation 16 can be used to take advantage of the fact that $P_c$ is constrained along the detector line:

$$y_c = m_d x_c + b_d; \text{ and} \quad \text{Equation 20}$$

$$\frac{dy_c}{dy_n} = m_d \frac{dx_c}{dy_n}.$$

In order to differentiate $b_s$ and $m_s$ with respect to $y_n$, one can first define them with respect to their coordinates.

$$m_s = \frac{y_2 + y_1}{x_2 + x_1}; \quad \text{Equation 21}$$

$$y_2 = m_s x_2 + b_s; \; y_1 = m_s x_1 + b_s;$$

$$b_s = y_2 - \left(\frac{y_2 - y_1}{x_2 - x_1}\right)x_2; \text{ and} \quad \text{Equation 22}$$

$$b_s = y_1 - \left(\frac{y_2 - y_1}{x_2 - x_1}\right)x_1. \quad \text{Equation 23}$$

These can be now differentiated to find the lower level derivatives (note that one use different variants for $db_s/dy_n$ to keep the equations simple).

$$\frac{dm_s}{dy_1} = \frac{d}{dy_1}\left\{\frac{y_2 - y_1}{x_2 - x_1}\right\}; \quad \text{Equation 24}$$

$$\frac{dm_s}{dy_1} = -(x_2 - x_1)^{-1};$$

$$\frac{dm_s}{dy_2} = \frac{d}{dy_2}\left\{\frac{y_2 - y_1}{x_2 - x_1}\right\}; \quad \text{Equation 25}$$

-continued $$\frac{dm_s}{dy_2} = (x_2 - x_1)^{-1};$$

$$\frac{db_s}{dy_1} = \frac{d}{dy_1}\left\{y_2 - \left(\frac{y_2 - y_1}{x_2 - x_1}\right)x_2\right\}; \quad \text{Equation 26}$$

$$\frac{db_s}{dy_1} = \frac{x_2}{x_2 - x_1};$$

$$\frac{db_s}{dy_2} = \frac{d}{dy_2}\left\{y_1 - \left(\frac{y_2 - y_1}{x_2 - x_1}\right)x_1\right\}; \quad \text{Equation 27}$$

$$\frac{db_s}{dy_2} = \frac{-x_1}{x_2 - x_1}.$$

Using the above equations, one can write Equation 19 in the specific forms one need:

$$\frac{dx_c}{dy_1} = \frac{(m_d - m_s)\frac{db_s}{dy_1} + (b_s - b_d)\frac{dm_s}{dy_1}}{(m_s - m_d)^2};$$

$$\frac{dx_c}{dy_2} = \frac{(m_d - m_s)\frac{db_s}{dy_2} + (b_s - b_d)\frac{dm_s}{dy_2}}{(m_s - m_d)^2};$$

$$\frac{dx_c}{dy_1} = \frac{(m_d - m_s)\left(\frac{x_2}{x_2 - x_1}\right) + (b_s - b_d)\left(-(x_2 - x_1)^{-1}\right)}{(m_s - m_d)^2};$$

$$\frac{dx_c}{dy_2} = \frac{(m_d - m_s)\left(\frac{-x_1}{x_2 - x_1}\right) + (b_s - b_d)(x_2 - x_1)^{-1}}{(m_s - m_d)^2};$$

$$\frac{dx_c}{dy_1} = \frac{x_2(m_d - m_s) + b_d - b_s}{(x_2 - x_1)(m_s - m_d)^2}; \quad \text{Equation 28}$$

$$\frac{dx_c}{dy_2} = \frac{x_1(m_s - m_d) + b_s - b_d}{(x_2 - x_1)(m_s - m_d)^2}. \quad \text{Equation 29}$$

To calculate the change in a ratio function with respect to the change in a point on the surface:

One can now go back to Equation 14 and combine it with Equation 20:

$$\frac{d\Delta}{dy_n} = \frac{x_c - x_s + m_d(y_c - y_s)}{\Delta} \cdot \frac{dx_c}{dy_n}. \quad \text{Equation 30}$$

Finally, by combining all of the above, one can establish the final $dR_m/dy_n$ required for the solution matrix as:

$$\ln\left(\frac{I_A}{I_B}\right) = \mu_p \cdot (d\Delta_B - d\Delta_A) = R_n;$$

$$\frac{dR_n}{dy_n} = \frac{d}{dy_n}\left\{\ln\left(\frac{I_A}{I_B}\right)\right\} = \mu_p\left(\frac{d\Delta_B}{dy_n} - \frac{d\Delta_A}{dy_n}\right);$$

$$\frac{d\Delta_x}{dy_n} = \frac{1\{(x_c - x_s) + m_d(y_c - y_s)\}}{\Delta_x} \cdot \frac{dx_c}{dy_n};$$

$$\frac{dx_c}{dy_n} = \frac{(m_d - m_s)\frac{db_s}{dy_n} + (b_s - b_d)\frac{dm_s}{dy_n}}{(m_s - m_d)^2};$$

$$\frac{db_s}{dy_1} = \frac{x_2}{x_2 - x_1}; \frac{db_s}{dy_2} = \frac{-x_1}{x_2 - x_1};$$

Figure 16A:
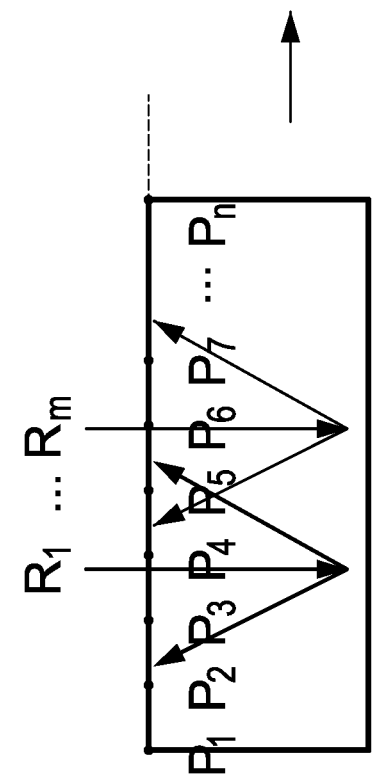
FIGS. 16A and 16B are sectional views of the structure of FIG. 14, showing a plurality of inspected target points used in determining a surface profile indication, in accordance with one or more embodiments.
Figure 16B:
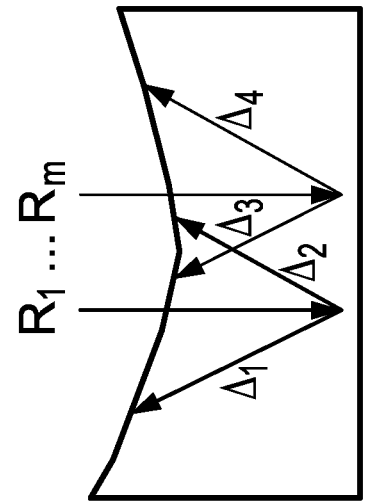
Figure 17:
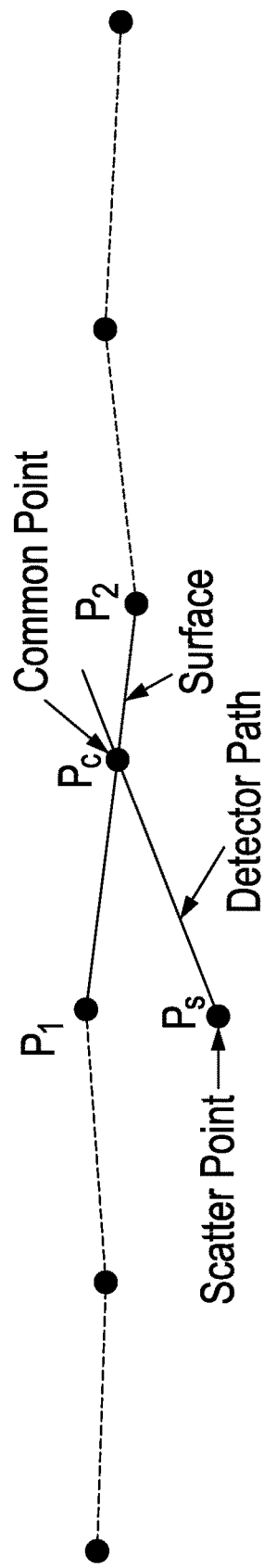
FIG. 17 is a schematic view of an example of a surface profile indication, in accordance with one or more embodiments.

-continued $$\frac{dm_s}{dy_1} = -(x_2 - x_1)^{-1}; \frac{dm_s}{dy_2} = (x_2 - x_1)^{-1};$$

where $I_A$ and $I_B$ are the measured values from the symmetric measurement; $\Delta_A$ and $\Delta_B$ are the detector path lengths for the respected measurement; $\mu_p$ is the exiting attenuation coefficient of the primary material; $x_1, y_1$ are the coordinates for the left most surface point; $x_2, y_2$ are the coordinates for the right most surface point; $m_d$ and $b_d$ are the slope and y-intercept values for the detector path; $m_s$ and $b_s$ are the slope and y-intercept values for the surface line segment; and x in $\Delta_x$ means A or B. FIGS. 16A, 16B and 17 show example surface profile indications computed using the above equations.

Example 2

Figure 18:
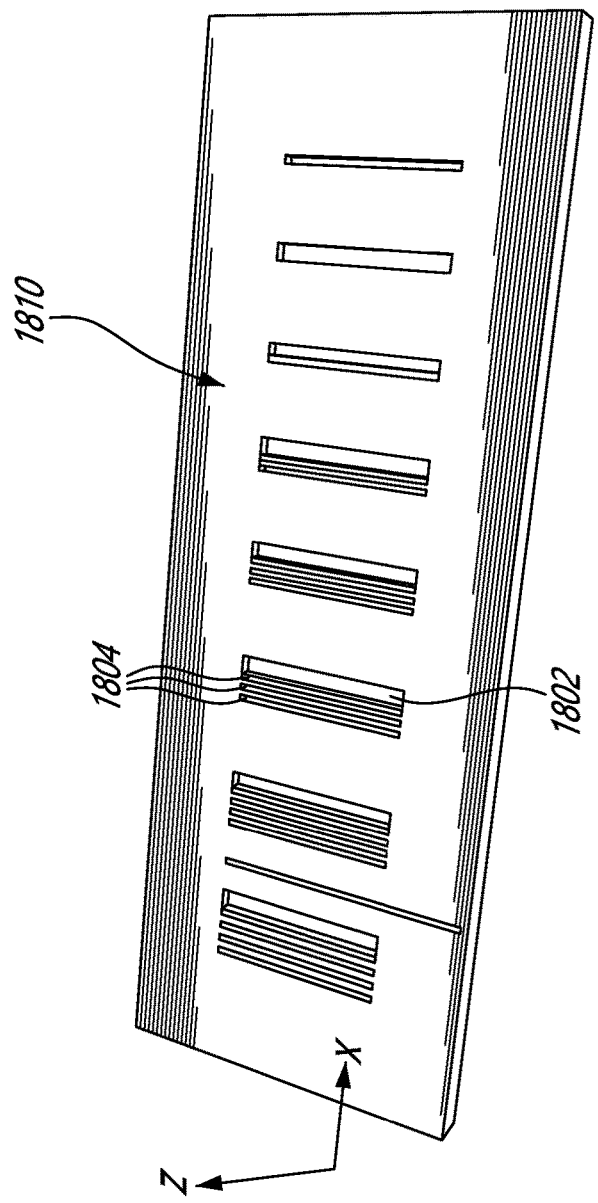
FIG. 18 is an oblique view of an example structure having a given surface profile, in accordance with one or more embodiments.

Using a Differential Matrix to Reconstruct a Surface Profile Indication to be Updated Based on Ratios Associated to Further Inspect Target Points FIG. 18 shows a structure 1810 having a given surface profile 1802. As shown, the surface profile 1802 has a succession of parallel grooves 1804 of increasing depths recessed within the structure 1810. In this specific example, the structure 1810 is made of steel, and shows areas of minor corrosion. Prior to inspection, a cover layer is to be installed on the structure 1810.

Figure 19:
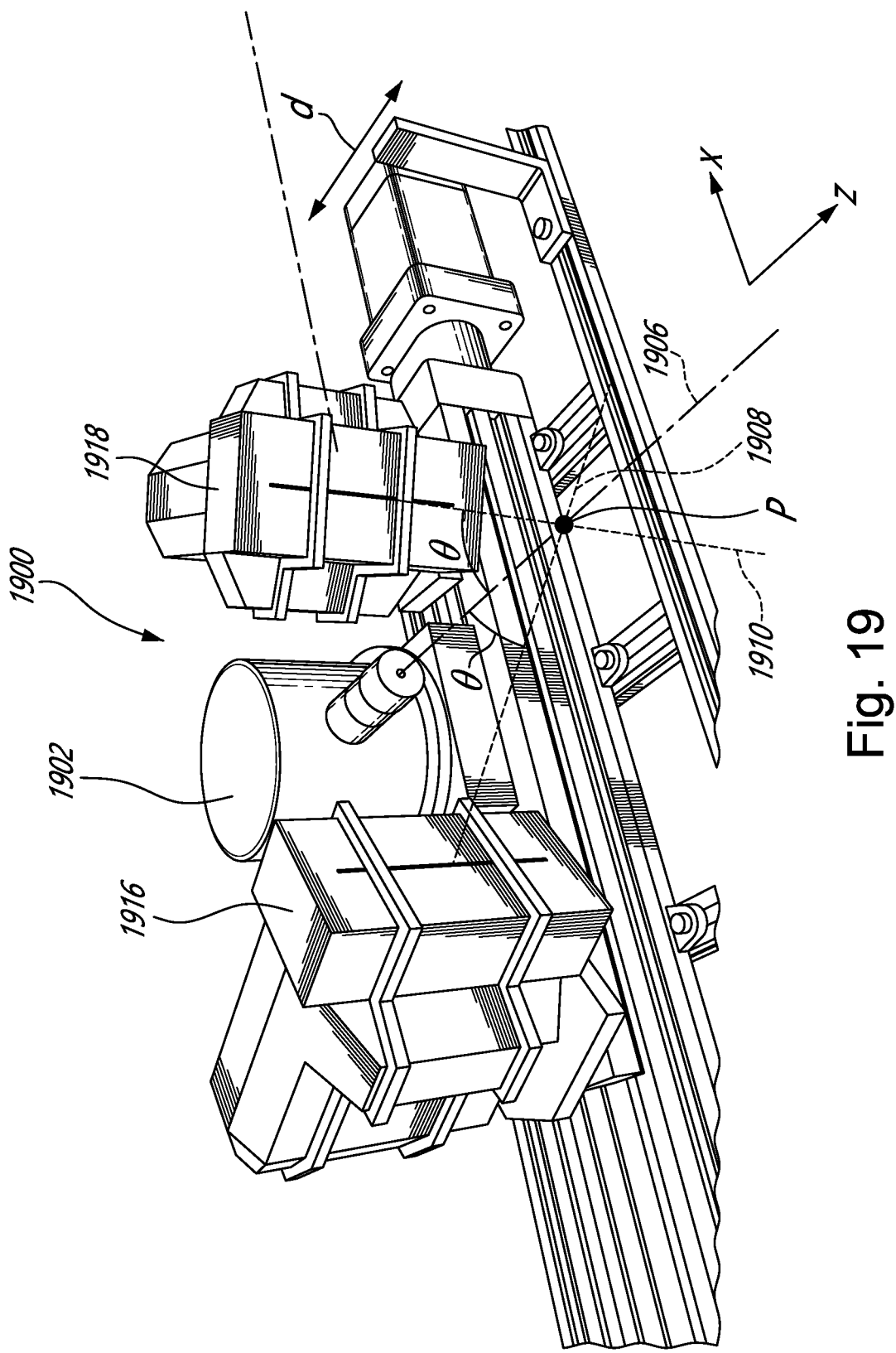
FIG. 19 is an oblique view of an example of a system for inspecting the structure of FIG. 18, in accordance with one or more embodiments.

FIG. 19 shows an example of a system 1900 for inspecting the structure 1810 of FIG. 18 across the installed cover layer. As shown, the system 1900 has a photon path 1906 leading to a target point P, and first and second scatter paths 1908 and 1910 originating from the target point P. During use, the structure 1810 of FIG. 18 is positioned at a given distance d from the system 1900 such that the target point P lies within the structure to inspect. As depicted, in this example, the photon path 1906, the first scatter path 1908 and the second scatter path 1910 extend in a common inspection plane x-z. The first and second scatter paths 1908 and 1910 form a respective scatter angle θ relative to the photon path 1906. The system 1900 has a high energy photon source 1902 emitting a high energy photon beam along the photon path 1906. First and second detectors 1916 and 1918 are provided to detect scatter signals incoming from along the first and second scatter paths 1908 and 1910, respectively. A computer is also provided to receive first and second values as generated by the first and second detectors 1908 and 1910, compare the first and second values to one another and inspect the structure 1810 based on such a comparison. As discussed above, a ratio r can be calculated on the basis of the first and second values.

Figure 20A:
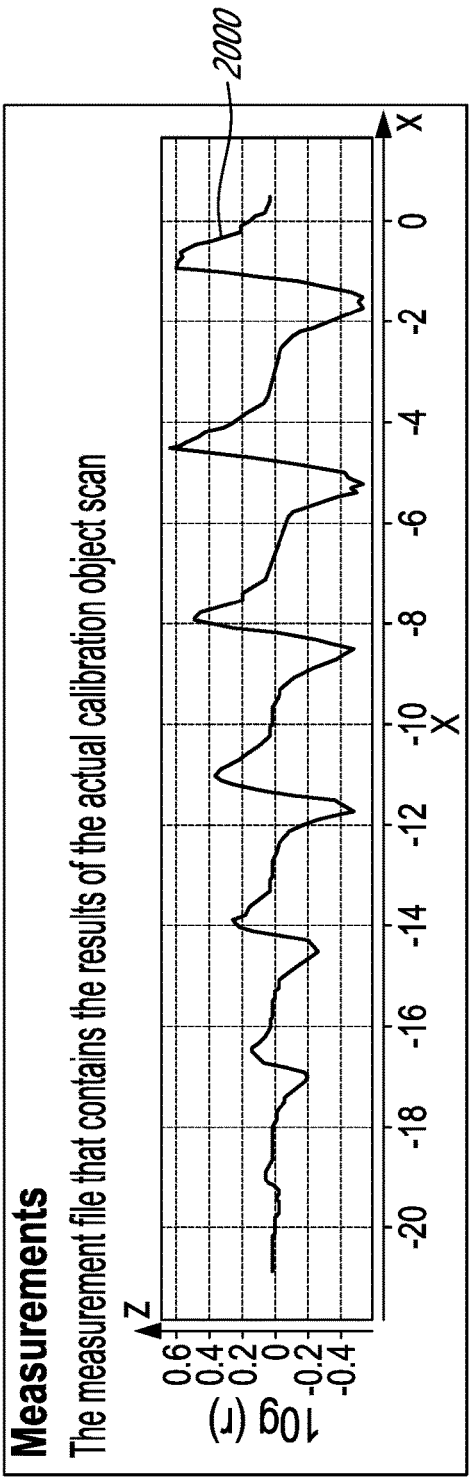
FIG. 20A is a graph showing ratios associated to target points of the structure of FIG. 18 when inspected using the system of FIG. 19, in accordance with one or more embodiments.
Figure 20B:
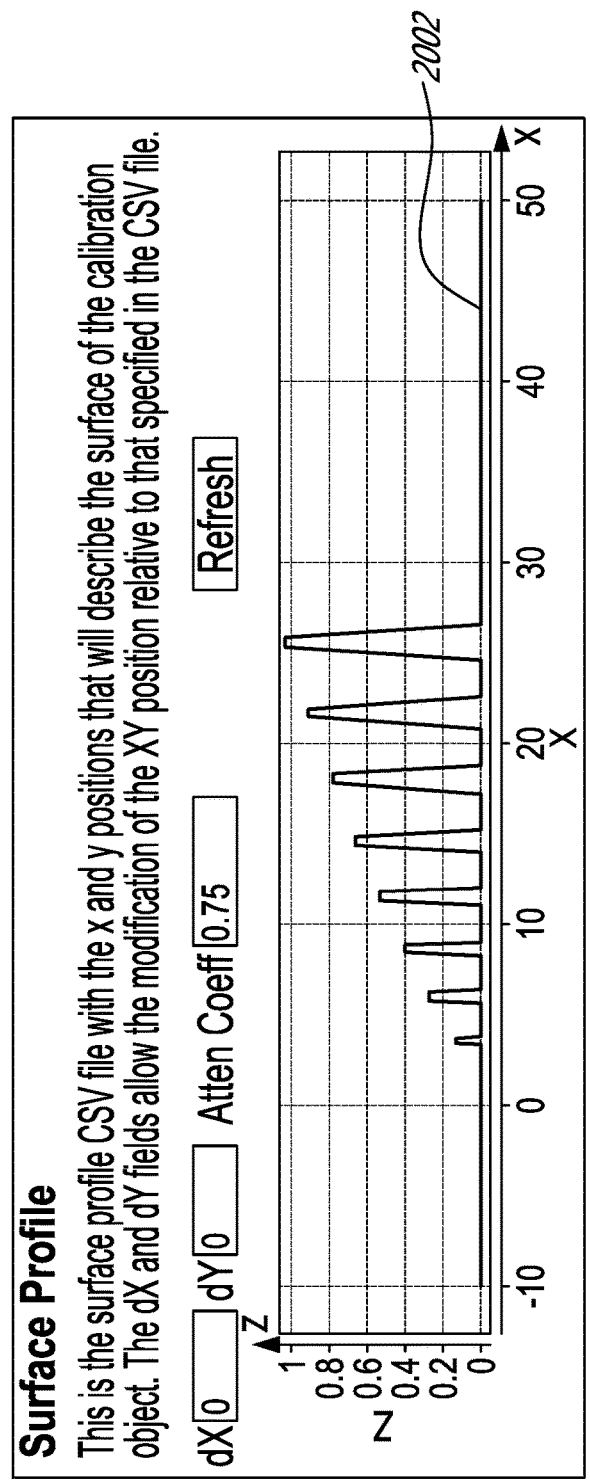
FIG. 20B is a graph showing a surface profile indication determined from the ratios of FIG. 20A, in accordance with one or more embodiments.
Figure 20C:
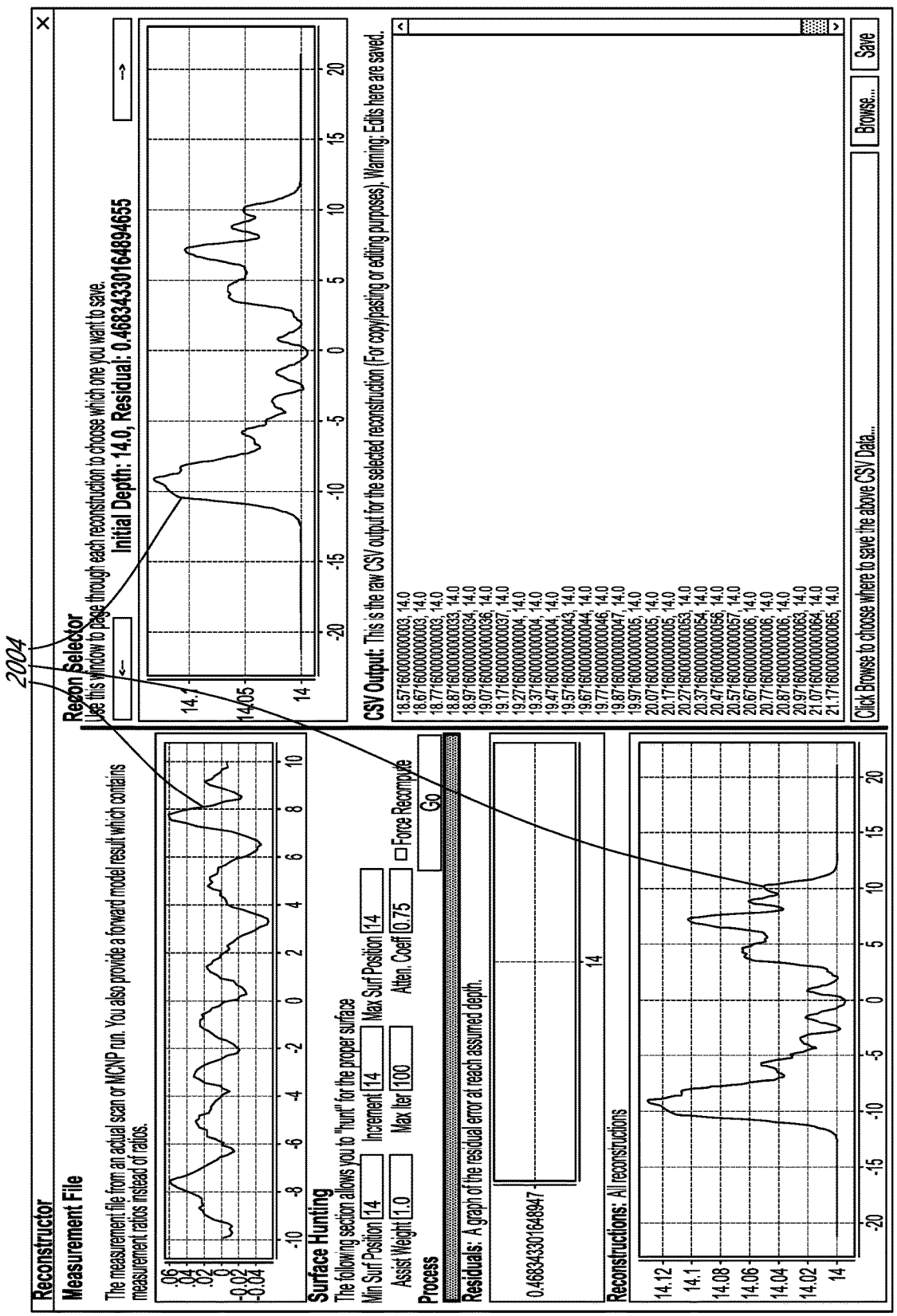
FIG. 20C shows graphs indicating quantitative information relative to the surface profile indication of FIG. 20B, in accordance with one or more embodiments.

FIG. 20A shows a graph plotting the logarithm of the calculated ratios, i.e., ln(r), for a series of target points P1, P2, P3, . . . , PN extending within the structure 1810 of FIG. 18. In this graph, the x-axis is expressed in terms of centimeters whereas the z-axis is dimensionless. As shown, the curve 2000 plotted in this graph may not represent a quantitative surface profile indication. However, when the ratios are processed using the above equations, a quantitative surface profile indication can be reconstructed based on the calculated ratios, thereby defect depth determination. An example of such a quantitative surface profile indication 2002 is shown in FIG. 20B. As depicted, both x- and z-axes are expressed in terms of centimeters in this graph. FIG. 20C also shows portions 2004 of the quantitative surface profile indication 2002 usable for actual quantitative measurements thereof. More specifically, FIG. 20C shows a 1.1 mm flaw at −10 cm and a 0.5 mm flaw approximately between 5 and 10 cm along the x-axis.

Figure 21A:
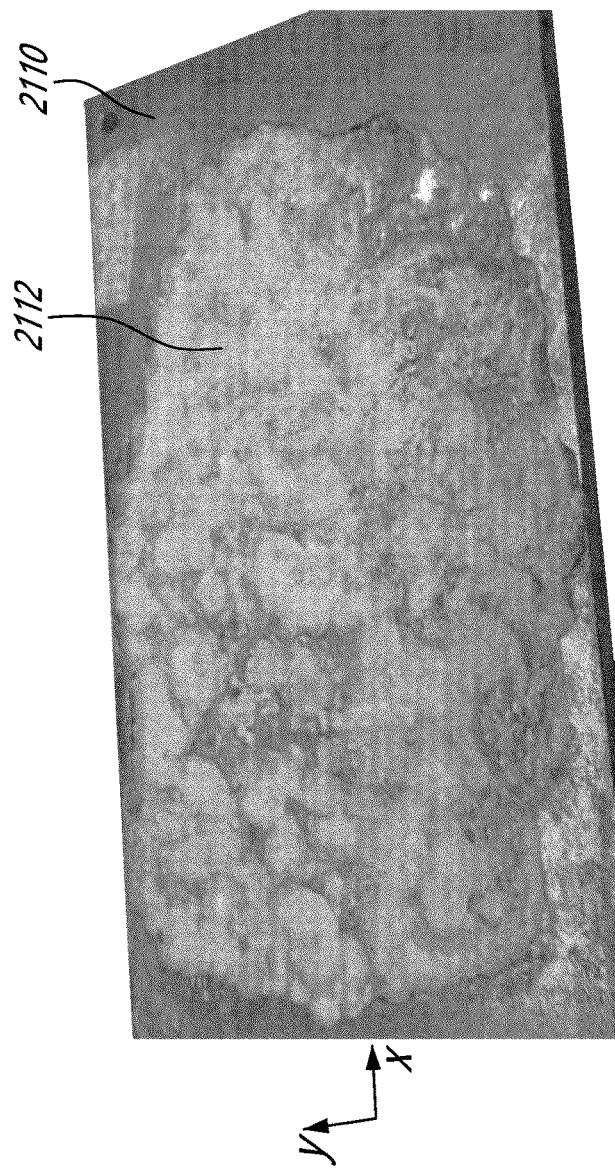
FIG. 21A is an oblique view of an example structure covered with a cover layer, in accordance with one or more embodiments.
Figure 21B:
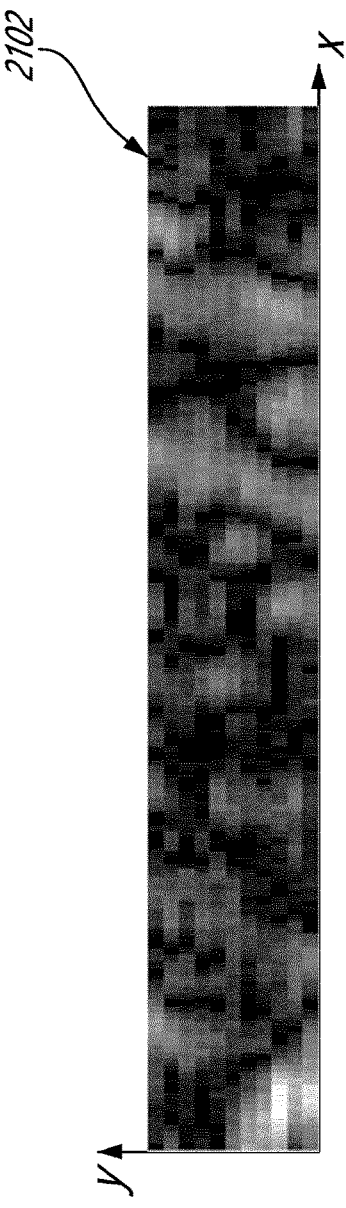
FIG. 21B is a map showing a surface profile indication associated to the example structure of FIG. 21A, in accordance with one or more embodiments.

FIG. 21A shows another example of a structure 2110 covered by a cover layer 2112. As shown in FIG. 21B, which illustrates a three-dimensional surface profile indication indicative 2102 of the surface profile of the underlying structure 2110, one can identify defects of the structure solely using the surface profile indication.

As can be understood, the examples described above and illustrated are intended to be exemplary only. For instance, as the inspection path described above is linear, other embodiments can involve curvilinear inspection path(s). In some embodiments, inspecting a structure without any cover layer can be performed. Accordingly, the cover layer can be omitted at least in some embodiments. The scope is indicated by the appended claims.

What is claimed is:

1. A method for inspecting a structure across a cover layer covering the structure, the method comprising:
   emitting a high energy photon beam along a photon path extending across said cover layer and leading to a target point within said structure, resulting in scattering along at least first and second scatter paths originating from said target point and extending back across said cover layer and away therefrom, said first and second scatter paths forming a respective one of first and second angles relative to said cover layer, the first and second angles being equal to one another, and defining an inspection plane comprising at least said target point;
   simultaneously detecting a first scatter signal incoming from said first scatter path and detecting a second scatter signal incoming from said second scatter path, and generating first and second values indicative therefrom;
   comparing said first and second values to one another; and
   inspecting said structure based on said comparing.

2. The method of claim 1 further comprising associating said first and second values to said target point.

3. The method of claim 2 further comprising:
   collectively moving said photon path, said first scatter path, and said second scatter path within said inspection plane such that said photon path, said first scatter path, and said second scatter path intersect at another target point within said structure; and
   repeating said steps of emitting, simultaneously detecting, generating, comparing, and associating for said other target point;
   wherein said inspecting is based on said first and second values associated to both said target point and to the other target point.

4. The method of claim 3 further comprising repeating the method for a plurality of other target points lying in said inspection plane and within said structure.

5. The method of claim 3 further comprising outputting a surface profile indication indicative of a surface of said structure above said inspected target points, wherein said inspecting is based on said outputted surface profile indication.

6. The method of claim 5 further comprising printing a three-dimensional representation of said surface profile indication.

7. The method of claim 1 wherein said comparing comprises calculating a ratio between said first and second values, and assigning said ratio to said corresponding target point.

8. The method of claim 1 wherein said photon path lies in said inspection plane.

9. The method of claim 1 wherein said structure is metallic, said inspecting comprising evaluating whether corrosion is present across at least one of first and second scatter paths.

10. The method of claim 1 wherein said structure has a first material of a first density, said cover layer having a second material of a second density lower than said first density.

11. A system for inspecting a structure across a cover layer covering said structure, the system comprising:
- a photon path extending across said cover layer and leading to a target point within said structure;
- first and second scatter paths originating from said target point and extending back across said cover layer and away therefrom, said first and second scatter paths forming a respective one of first and second angles relative to said cover layer, the first and second angles being equal to one another, and defining an inspection plane comprising at least said target point;
- a high energy photon source emitting a high energy photon beam along said photon path, resulting in scattering along at least said first and second scatter paths;
- a first detector detecting a first scatter signal incoming from said first scatter path, and generating a first value indicative of said first scatter signal;
- a second detector detecting a second scatter signal incoming from said second scatter path, and generating a second value indicative of said second scatter signal, said first and second scatter signals being detected simultaneously by said first and second detectors;
- a controller having a processor and a memory having stored thereon instructions that when executed by said processor perform the steps of:
  - comparing said first and second values to one another; and
  - inspecting said structure based on said comparing.

12. The system of claim 11 further comprising a frame to which said high energy photon source, said first detector and said second detector are mounted.

13. The system of claim 12 wherein said frame is provided in the form of a housing enclosing said high energy photon source, said first detector and said second detector.

14. The system of claim 12 further comprising feet spacing said frame from said cover layer.

15. The system of claim 14 wherein said feet extend between proximal ends fixed to said frame and distal ends having rollers movably engageable with said cover layer.

16. The system of claim 11 wherein said controller further performs:
- associating said first and second values to said target point; and
- upon collectively moving said photon path, said first scatter path, and said second scatter path within said inspection plane such that said photon path, said first scatter path, and said second scatter path intersect at another target point within said structure, repeating said steps of emitting, simultaneously detecting, generating, comparing, and associating for said other target point;
- wherein said inspecting is based on said first and second values associated to said target point and to the other target point.

17. The system of claim 16 further comprising repeating said steps for a plurality of other target points lying in said inspection plane and within said structure.

18. The system of claim 16 further comprising a user interface outputting a surface profile indication indicative of a surface of said structure above said inspected target points.

19. The system of claim 11 wherein said photon path lies in said inspection plane.

20. The system of claim 11 wherein said structure has a first material of a first density, said cover layer having a second material of a second density lower than said first density.

* * * * *